(12) United States Patent
Koga et al.

(10) Patent No.: US 12,062,958 B2
(45) Date of Patent: Aug. 13, 2024

(54) ARMATURE

(71) Applicant: AISIN CORPORATION, Kariya (JP)

(72) Inventors: Kiyotaka Koga, Nishio (JP);
Tomotsugu Sugihara, Okazaki (JP);
Takahiro Kobuchi, Kariya (JP)

(73) Assignee: AISIN CORPORATION, Kariya (JP)

( * ) Notice: Subject to any disclaimer, the term of this patent is extended or adjusted under 35 U.S.C. 154(b) by 871 days.

(21) Appl. No.: 17/045,714

(22) PCT Filed: Feb. 7, 2019

(86) PCT No.: PCT/JP2019/004435
§ 371 (c)(1),
(2) Date: Oct. 6, 2020

(87) PCT Pub. No.: WO2019/230057
PCT Pub. Date: Dec. 5, 2019

(65) Prior Publication Data
US 2021/0167649 A1    Jun. 3, 2021

(30) Foreign Application Priority Data

May 30, 2018  (JP) ................ 2018-103240

(51) Int. Cl.
  *H02K 3/04*   (2006.01)
  *H02K 3/12*   (2006.01)
  *H02K 3/28*   (2006.01)
  *H02K 15/06*  (2006.01)
(52) U.S. Cl.
  CPC .............. *H02K 3/12* (2013.01); *H02K 3/28* (2013.01); *H02K 15/064* (2013.01)

(58) Field of Classification Search
  CPC ............ H02K 3/12; H02K 3/28; H02K 15/064
  USPC .......................................................... 310/179
  See application file for complete search history.

(56) References Cited

U.S. PATENT DOCUMENTS

| 8,368,276 B2* | 2/2013 | Wolf ................. H02K 15/0442 310/179 |
| 2003/0011268 A1* | 1/2003 | Even ....................... H02K 9/06 310/179 |
| 2003/0015932 A1* | 1/2003 | Oohashi ............ H02K 15/0478 310/201 |

(Continued)

FOREIGN PATENT DOCUMENTS

DE  102015225585 A1 *  6/2017
JP  2006-141076 A      6/2006

(Continued)

OTHER PUBLICATIONS

DE-102015225585—Machine-Translation (Year: 2017).*

(Continued)

*Primary Examiner* — Tran N Nguyen
*Assistant Examiner* — Masoud Vaziri
(74) *Attorney, Agent, or Firm* — Oliff PLC

(57) ABSTRACT

In this armature, facing surfaces which are portions where a first segment conductor and a second segment conductor are joined together are disposed so as to overlap each other as viewed in a radial direction, and an end part of at least one of the first segment conductor and the second segment conductor is provided with chamfered parts at edge parts on both circumferential sides of the end part.

11 Claims, 19 Drawing Sheets

(56) References Cited

U.S. PATENT DOCUMENTS

2014/0300237 A1* 10/2014 Tokizawa ............... H02K 15/04
                                                    310/201
2017/0025907 A1*  1/2017 Iki ...................... H02K 15/0414
2017/0040859 A1*  2/2017 Langlard ................ H02K 3/28
2018/0026502 A1*  1/2018 Kawasaki ............. H02K 15/03
                                                    310/179

FOREIGN PATENT DOCUMENTS

JP         2013-211939 A     10/2013
JP          2013211939 A  * 10/2013
WO         WO-9528026 A1 * 10/1995 ............... H02K 3/12

OTHER PUBLICATIONS

WO 9528026 A1 (Year: 1995).*
Jun. 4, 2021 Supplementary Search Report issued in European Patent Application No. 19810809.4.
May 7, 2019 International Search Report issued in International Patent Application No. PCT/JP2019/004435.

* cited by examiner

ARMATURE

TECHNICAL FIELD

The preferred embodiment relates to an armature.

BACKGROUND ART

Conventionally, there is known an armature including an armature core provided with a plurality of slots extending in a central axis line direction. Such an armature is disclosed in, for example, JP 2006-141076 A.

JP 2006-141076 A discloses a rotating electrical machine stator (hereinafter, referred to as "stator") including a stator core provided with a plurality of slots extending in a central axis line direction (axial direction). In the stator, an end part of a linear part (leg part) of a one-side conductor segment disposed on one side in the axial direction of the stator core and an end part of a linear part (leg part) of an other-side conductor segment disposed on the other side in the axial direction of the stator core are joined together in a slot. Specifically, an insulating insulator is disposed in the slot. The linear part of the one-side conductor segment and the linear part of the other-side conductor segment are inserted inside the insulating insulator disposed in the slot and are joined together. Specifically, a facing surface which is a plane axially perpendicular to the linear part of the one-side conductor segment and a facing surface which is a plane axially perpendicular to the linear part of the other-side conductor segment are joined together.

In addition, in JP 2006-141076 A, the end part (facing surface) of the linear part of the one-side conductor segment and the end part (facing surface) of the linear part of the other-side conductor segment both have chamfered parts formed thereat. The chamfered parts are provided so as to intersect a circumferential direction when the linear part of the one-side conductor segment (the linear part of the other-side conductor segment) is viewed in a radial direction. That is, the chamfered parts are formed so as to extend in the radial direction when the linear part is viewed in the radial direction. In addition, the chamfered parts are provided on both circumferential sides of the end part of the linear part. By this, the end part of the linear part has an end-thinning shape as viewed in the radial direction. As a result, the linear part of the one-side conductor segment (the linear part of the other-side conductor segment) can be easily inserted inside the insulating insulator. In addition, in the slot (the inside of the insulating insulator), the chamfered facing surface of the linear part of the one-side conductor segment and the chamfered facing surface of the linear part of the other-side conductor segment are joined together with a conductive joint material, with the chamfered facing surfaces facing each other.

CITATIONS LIST

Patent Literature
Patent Literature 1: JP 2006-141076 A

SUMMARY

Technical Problems

However, in JP 2006-141076 A, since the facing surface of the linear part of the one-side conductor segment and the facing surface of the linear part of the other-side conductor segment are both chamfered, the areas of the facing surfaces are relatively small. Hence, there is a possible problem of a shortage of a joint area available for joining together the linear part of the one-side conductor segment and the linear part of the other-side conductor segment.

Disclosed embodiments are directed to solve a problem such as that described above, and provides an armature capable of preventing a shortage of a joint area.
Solutions to Problems To provide the above-described armature, an armature according to a preferred embodiment includes: an armature core provided with a plurality of slots extending in a central axis line direction; and a coil part having a plurality of segment conductors whose facing surfaces are joined together, the plurality of segment conductors being disposed so as to face the central axis line direction, and the plurality of segment conductors include a first segment conductor disposed on one side in the central axis line direction of the armature core; and a second segment conductor disposed on an other side in the central axis line direction of the armature core, the facing surfaces provided at an end part of the first segment conductor and an end part of the second segment conductor are disposed so as to overlap each other as viewed in a radial direction, the facing surfaces being portions where the first segment conductor and the second segment conductor are joined together, and the end part of at least one of the first segment conductor and the second segment conductor is provided with chamfered parts at edge parts on both circumferential sides of the end part.

In the armature according to the one aspect of the preferred embodiment, as described above, facing surfaces which are portions where a first segment conductor and a second segment conductor are joined together and which are provided at an end part of the first segment conductor and an end part of the second segment conductor are disposed so as to overlap each other as viewed in the radial direction, and the end part of at least one of the first segment conductor and the second segment conductor is provided with chamfered parts at edge parts on both circumferential sides thereof. By this, since the facing surface of the first segment conductor and the facing surface of the second segment conductor are provided so as to overlap each other as viewed in the radial direction, even when chamfered parts are provided at the end part of at least one of the first segment conductor and the second segment conductor, the amount of reduction in the area of the facing surface can be reduced. As a result, a shortage of a joint area can be prevented.
Advantages According to the preferred embodiment, as described above, a shortage of a joint area can be prevented.

BRIEF DESCRIPTION OF DRAWINGS

FIG. 8 is a transverse cross-sectional view showing a configuration of a segment conductor according to one embodiment.

FIG. 9 is a diagram (1) showing a configuration of general conductors according to one embodiment.

FIG. 25 is a partial enlarged view of FIG. 24.

FIG. 26 is a diagram of a first segment conductor as viewed in the radial direction according to the third variant.

DESCRIPTION OF EMBODIMENTS

The present embodiment of the preferred embodiment will be described below based on the drawings.

Present Embodiment (Structure of a Stator)

With reference to FIGS. 1 to 16, a structure of a stator 100 according to the present embodiment will be described. The stator 100 has an annular shape having a central axis line C1 at the center thereof. Note that the stator 100 is an example of an "armature" in the claims.

Figure 1:
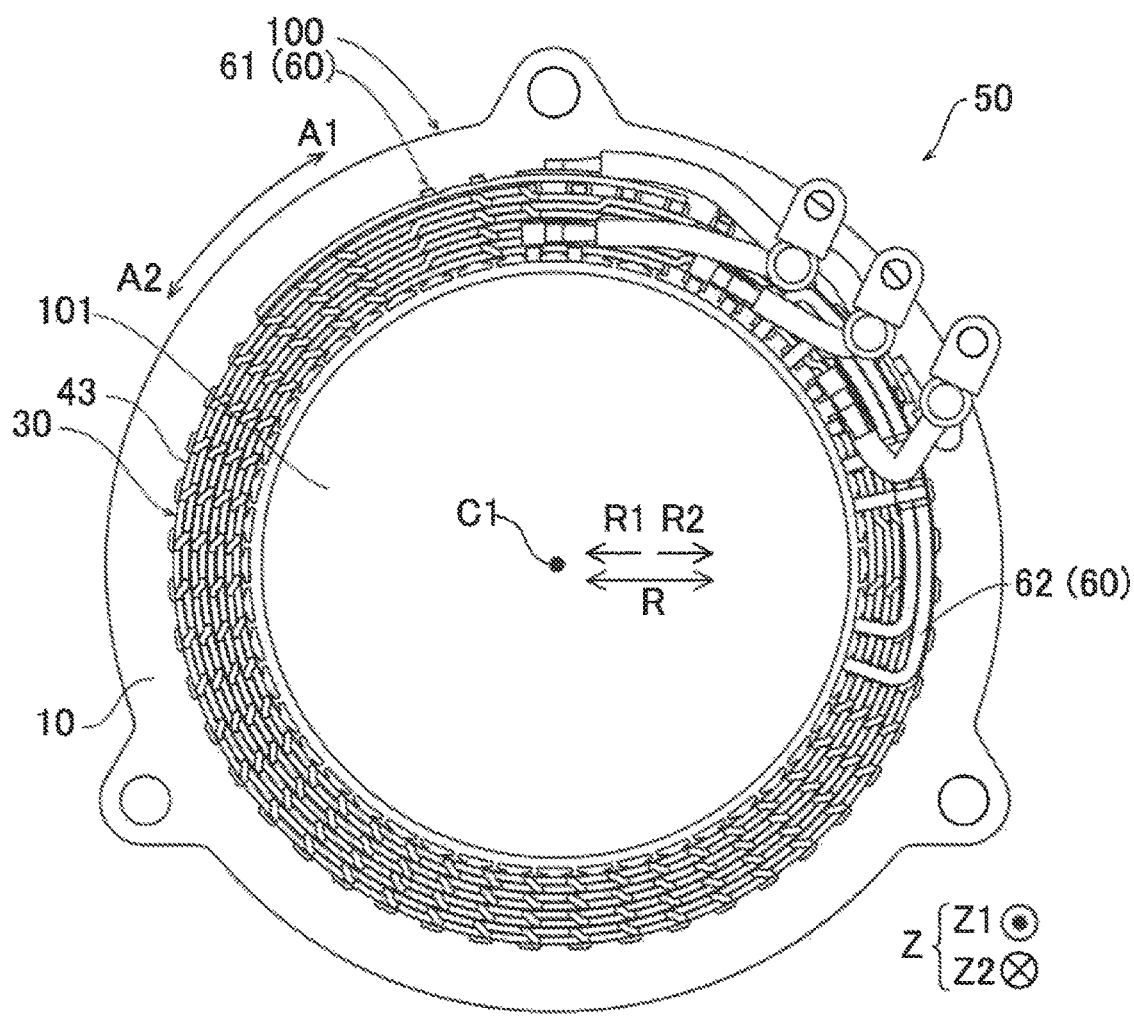
FIG. 1 is a plan view showing a configuration of a stator (rotating electrical machine) according to one embodiment.

In the specification of this application, an "axial direction (central axis line direction)" indicates, as shown in FIG. 1, a direction (Z-direction) along the central axis line C1 of the stator 100 (a rotation axis line of a rotor 101). In addition, a "circumferential direction" indicates a circumferential direction (an A1-direction and an A2-direction) of the stator 100. In addition, a "radial direction" indicates a radial direction (R-direction) of the stator 100. In addition, a "radial inner side" indicates a direction (R1-direction) going toward the central axis line C1 of the stator 100 in the radial direction. In addition, a "radial outer side" indicates a direction (R2-direction) going toward the outside of the stator 100 in the radial direction.

The stator 100 together with the rotor 101 forms a part of a rotating electrical machine 102. The rotating electrical machine 102 is constructed as, for example, a motor, a generator, or a motor-generator. As shown in FIG. 1, the stator 100 is disposed on the radial outer side of the rotor 101 having permanent magnets (not shown) provided thereon. Namely, in the present embodiment, the stator 100 forms a part of the inner-rotor rotating electrical machine 102.

Figure 2:
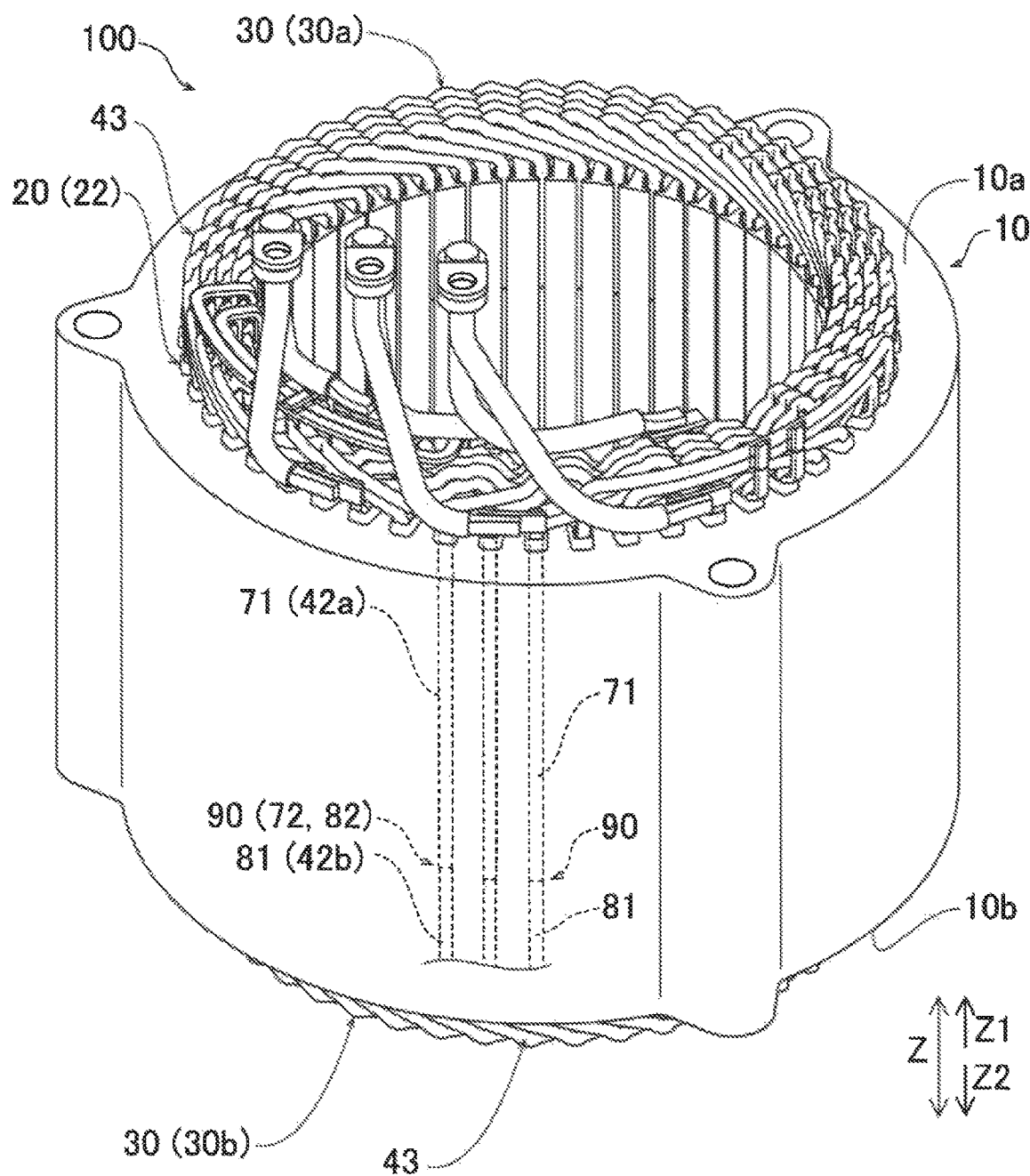
FIG. 2 is a perspective view showing a configuration of the stator according to one embodiment.
Figure 3:
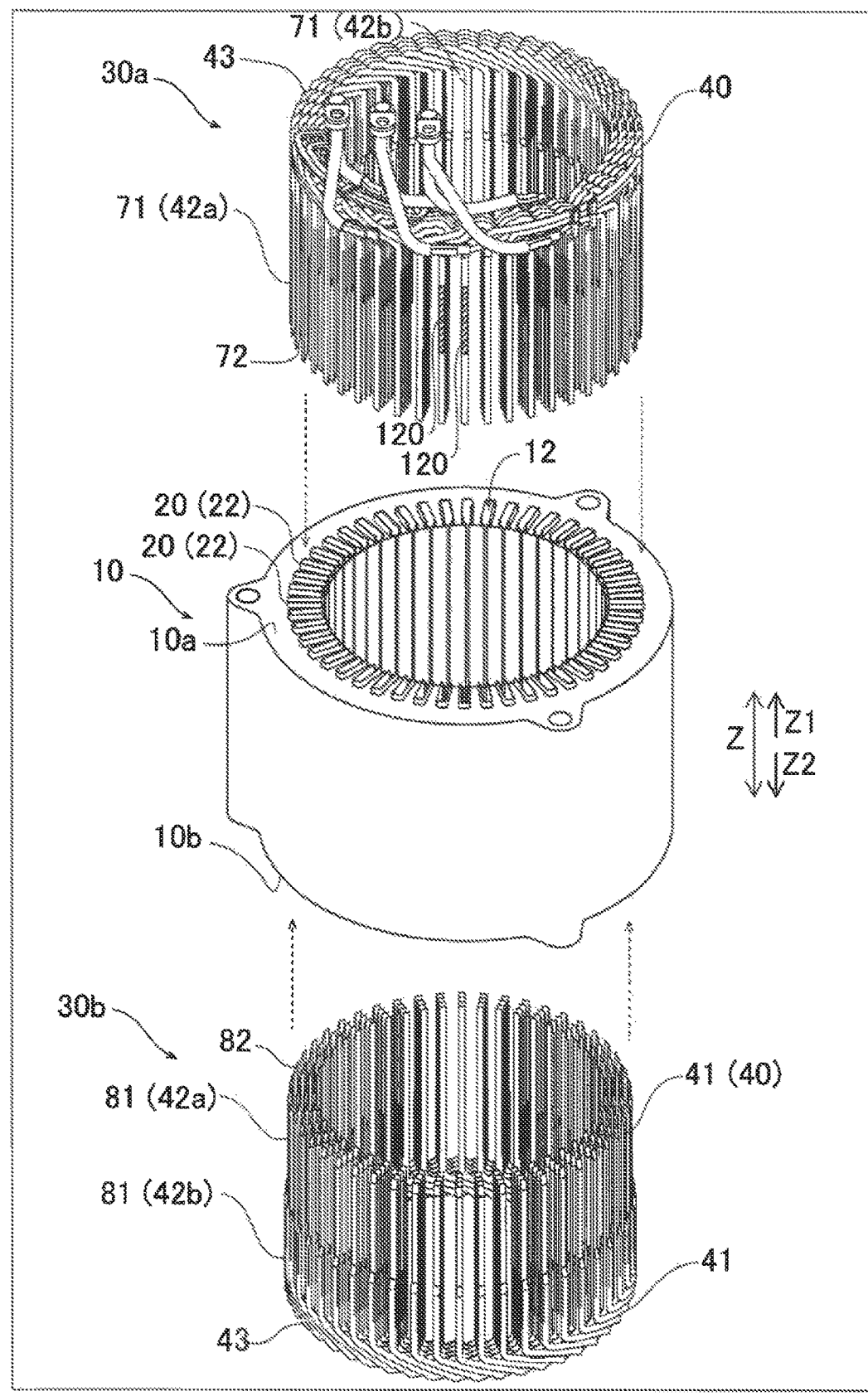
FIG. 3 is an exploded perspective view of the stator according to one embodiment.

As shown in FIG. 2, the stator 100 includes a stator core 10, insulating members 20, and a coil part 30. In addition, as shown in FIG. 3, the coil part 30 includes a first coil assembly 30a and a second coil assembly 30b. In addition, the coil part 30 includes a plurality of segment conductors 40. Note that the stator core 10 is an example of an "armature core" in the claims.

(Structure of the Stator Core)

Figure 4:
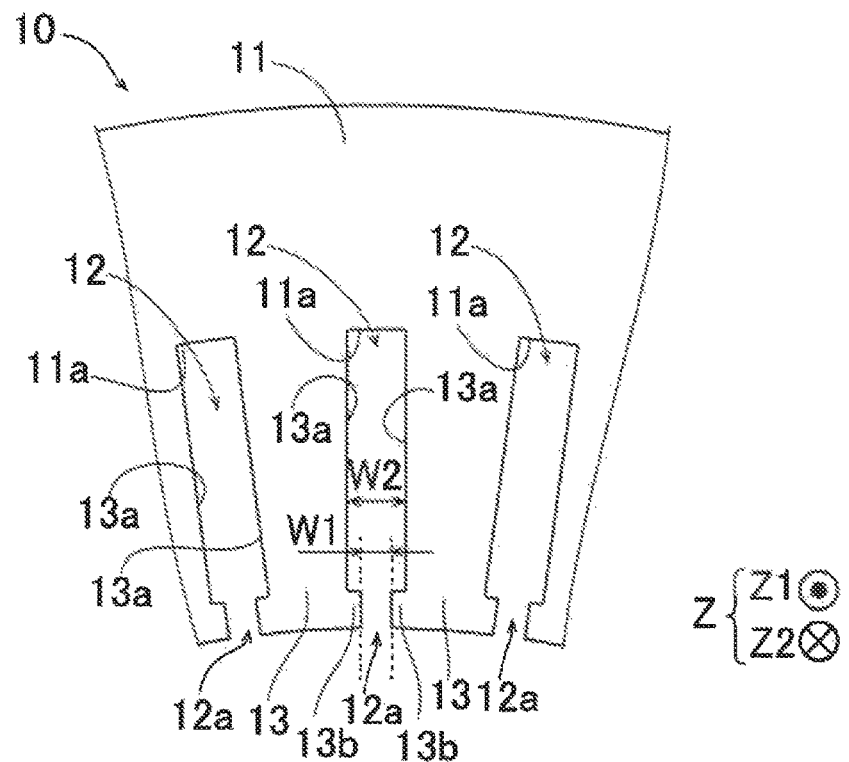
FIG. 4 is a plan view showing a configuration of a stator core according to one embodiment.

The stator core 10 has a cylindrical shape having the central axis line C1 (see FIG. 1) as its central axis. In addition, the stator core 10 is constructed by, for example, stacking a plurality of electromagnetic steel sheets (e.g., silicon steel sheets) in the axial direction. As shown in FIG. 4, the stator core 10 is provided with a back yoke 11 having an annular shape as viewed in the axial direction; and a plurality of slots 12 provided on the radial inner side of the back yoke 11 and extending in the axial direction. The stator core 10 is provided with a plurality of teeth 13 on both circumferential sides of the slots 12.

Each slot 12 is a portion surrounded by a wall part 11a of the back yoke 11 that is provided more on the radial outer side than a first other end surface 73 which will be described later, and circumferential side surfaces 13a of two teeth 13. The slot 12 is provided with an opening part 12a that opens on the radial inner side. In addition, the slot 12 opens on both axial sides. Each tooth 13 is formed so as to protrude from the back yoke 11 toward the radial inner side, and has projecting parts 13b formed at an end part on the radial inner side thereof, the projecting parts 13b forming opening parts 12a of slots 12.

Each opening part 12a has an opening width W1 in the circumferential direction. Here, the opening width W1 corresponds to a distance between end parts of projecting parts 13b of teeth 13. In addition, a width W2 of a portion of a slot 12 where the coil part 30 and an insulating member 20 are disposed is larger than the opening width W1. Namely, the slot 12 is constructed as a semi-open slot. Here, the width W2 corresponds to a distance between circumferential side surfaces 13a of teeth 13 disposed on both circumferential sides of the slot 12. In addition, the width W2 of the slot 12 is substantially constant in the radial direction.

(Structure of the Insulating Members)

Figure 5:
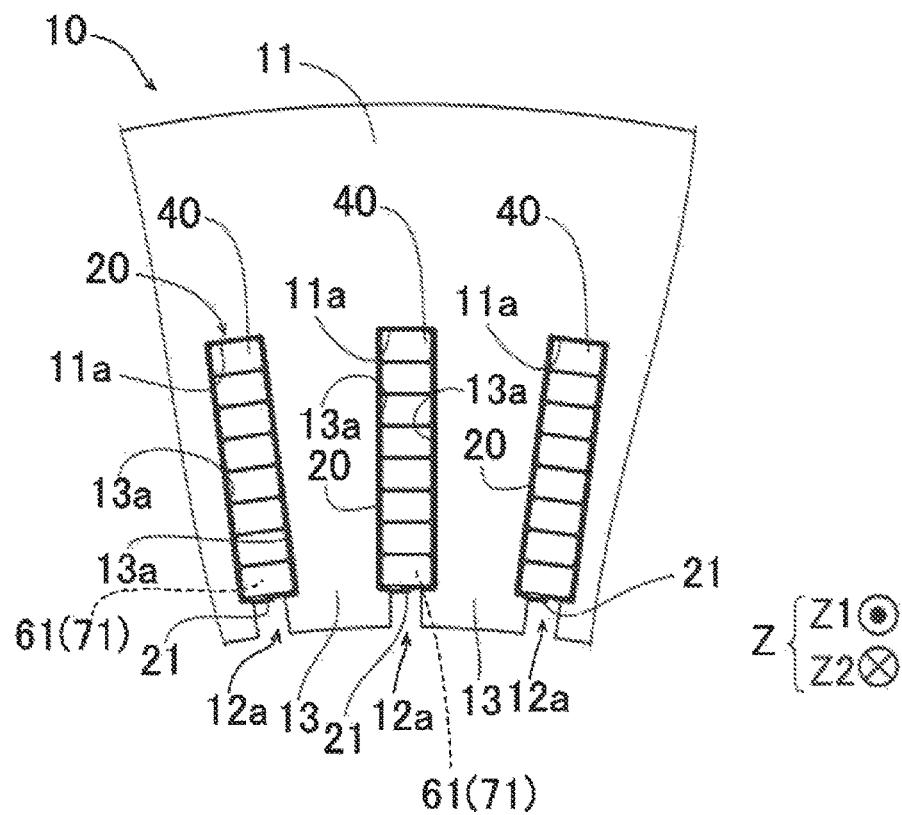
FIG. 5 is a cross-sectional view showing a configuration of insulating members according to one embodiment.

As shown in FIG. 5, each insulating member 20 is disposed between teeth 13 and segment conductors 40. The insulating member 20 includes a joint-portion covering part 21. The joint-portion covering part 21 is configured to cover at least the radial inner side of a joint portion 90 (described later) of one of a plurality of parallelly and radially arranged segment conductors 40 that is arranged on a side closest to an opening part 12a of a slot 12.

Specifically, the insulating members 20 are made of, for example, sheet-like insulating members such as aramid paper and polymer films, and have a function of ensuring insulation between the segment conductors 40 (the coil part 30) and the stator core 10. Each insulating member 20 is disposed between segment conductors 40 and circumferential side surfaces 13a of teeth 13 and between one of the plurality of segment conductors 40 that is disposed on the radially outermost side and a wall part 11a. In addition, as shown in FIG. 3, each insulating member 20 includes collar parts 22 (cuff parts) formed so as to protrude from a slot 12 toward the axial outer side on both axial sides and to be folded back.

Each insulating member 20 is disposed so as to entirely cover the circumference of a plurality of parallelly and radially arranged segment conductors 40 as viewed in an arrow "Z2" direction. In other words, both circumferential sides and both radial sides of leg parts 42a and 42b (described later) of the plurality of parallelly and radially arranged segment conductors 40 are covered by the insulating member 20. By this, it becomes possible to ensure insulation between the joint portions 90 and the stator core 10 by the insulating member 20.

(Structure of the Coil Part)

As shown in FIGS. 2 and 3, the coil part 30 is formed by axially combining and joining together the first coil assembly 30a provided on one axial side (an arrow "Z1" direction side) and the second coil assembly 30b provided on the other axial side (an arrow "Z2" direction side). The first coil assembly 30a and the second coil assembly 30b each are formed in annular shape having the same central axis line C1 as the stator core 10 (see FIG. 1) at the center thereof.

The coil part 30 is constructed as, for example, wave-winding coils. In addition, the coil part 30 is constructed as 8-turn coils. Namely, as shown in FIG. 5, the coil part 30 is configured such that eight segment conductors 40 are parallelly and radially arranged in each slot 12. The coil part 30 is configured such that by supplying three-phase alternating-current power to the coil part 30 from a power supply part (not shown), while current moves back and forth in the axial direction and flows in the circumferential direction, a magnetic flux is generated.

<Configuration of Connection of the Coil Part>

Figure 6:
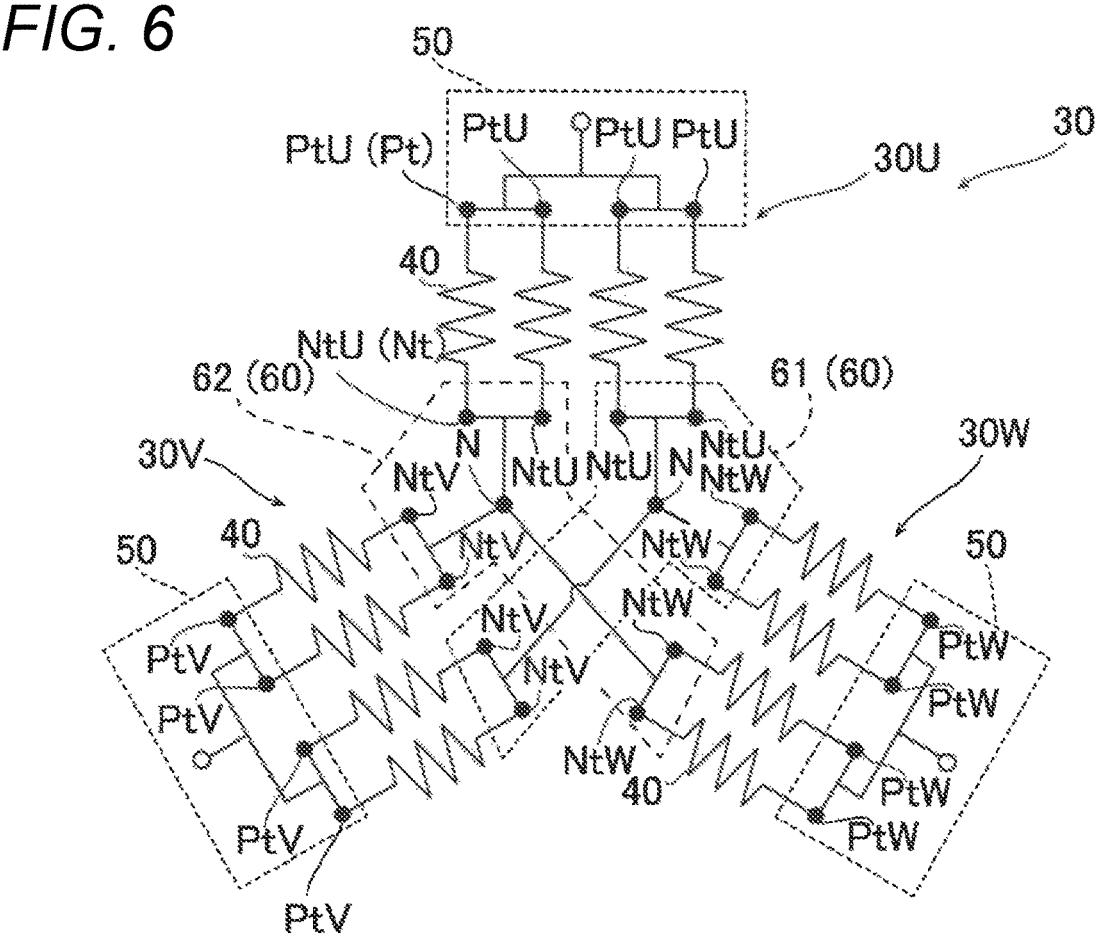
FIG. 6 is a circuit diagram showing a connection configuration of a coil part according to one embodiment.

As shown in FIG. 6, the coil part 30 is connected using three-phase "Y" connection. Namely, the coil part 30 includes a U-phase coil part 30U, a V-phase coil part 30V, and a W-phase coil part 30W. For example, the coil part 30 is provided with a plurality of neutral points N. Specifically, the coil part 30 is four parallel-connected (star-connected). Namely, the U-phase coil part 30U is provided with four neutral-point connection end parts NtU and four power-line connection end parts PtU. The V-phase coil part 30V is provided with four neutral-point connection end parts NtV and four power-line connection end parts PtV. The W-phase coil part 30W is provided with four neutral-point connection end parts NtW and four power-line connection end parts PtW. Note that in the following description when the neutral-point connection end parts and the power-line connection end parts for the U-phase, the V-phase, and the W-phase are not particularly distinguished from each other, they are simply described as "neutral-point connection end parts Nt" and "power-line connection end parts Pt".

<Structures of the Coil Assemblies>

Figure 7:
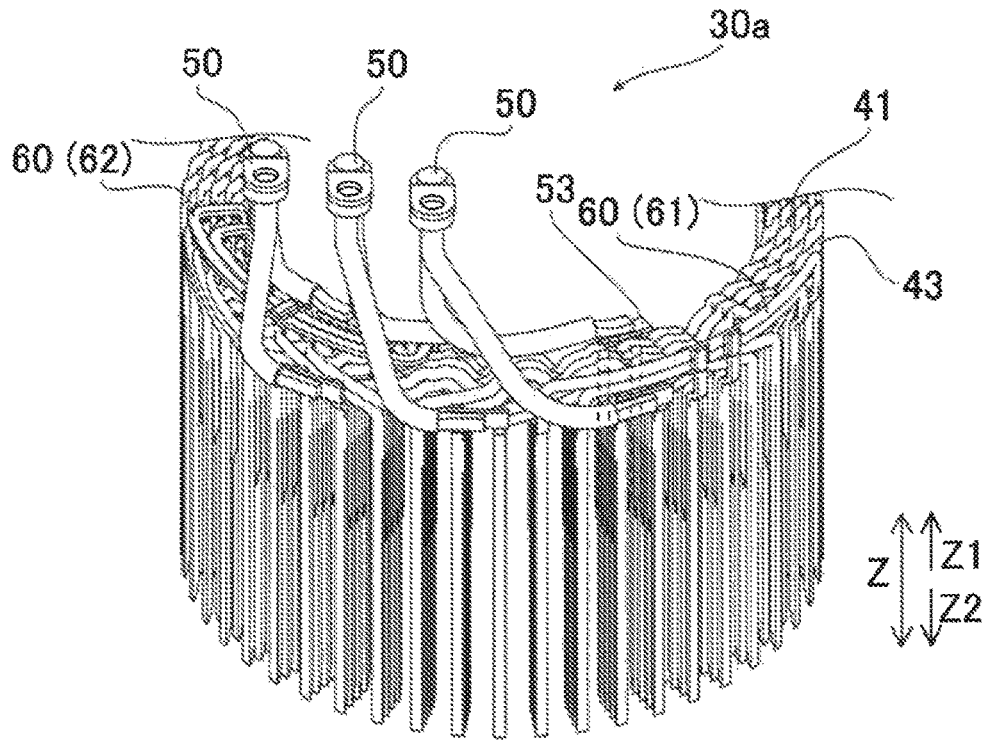
FIG. 7 is a perspective view showing a part of a first coil assembly according to one embodiment.

As shown in FIG. 7, the first coil assembly 30a includes a plurality of (e.g., three) segment conductors for power-line connection 50 (hereinafter, referred to as "power conductors 50") which are segment conductors 40; a plurality of (e.g., two) segment conductors for neutral point connection 60 (hereinafter, referred to as "neutral point conductors 60") which are segment conductors 40; and a plurality of general conductors 41 which are conductors (general segment conductors 40) different than the power conductors 50 and the neutral point conductors 60 among the plurality of segment conductors 40 and which form the coil part 30.

As shown in FIG. 3, the second coil assembly 30b includes a plurality of general conductors 41. Preferably, the second coil assembly 30b includes only a plurality of general conductors 41, and all of the power conductors 50 and the neutral point conductors 60 provided in the stator 100 are provided in the first coil assembly 30a.

(Structure of the Segment Conductors)

Figure 8A:
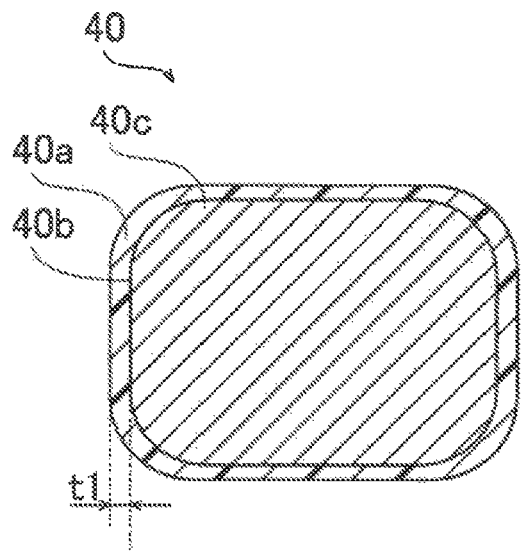
FIG. 8A is a diagram showing an insulating film and FIG. 8B is a diagram showing an insulating member.

As shown in FIG. 8(a), each segment conductor 40 is constructed as a rectangular conducting wire whose transverse section has a substantially rectangular shape. A conductor surface 40b of the segment conductor 40 is provided with an insulating film 40a having a thickness t1. The thickness t1 of the insulating film 40a is set to such a thickness, for example, that allows to ensure phase-to-phase insulation performance (insulation between coil end parts 43). In addition, a conductor main body 40c of the segment conductor 40 is made of, for example, a metal material (conductive material) such as copper or aluminum. Note that although FIG. 8 shows a magnitude relationship between thicknesses, etc., in an exaggerated manner for the sake of description, the configuration is not limited to the example shown in the drawing.

Figures 9A, 9B:
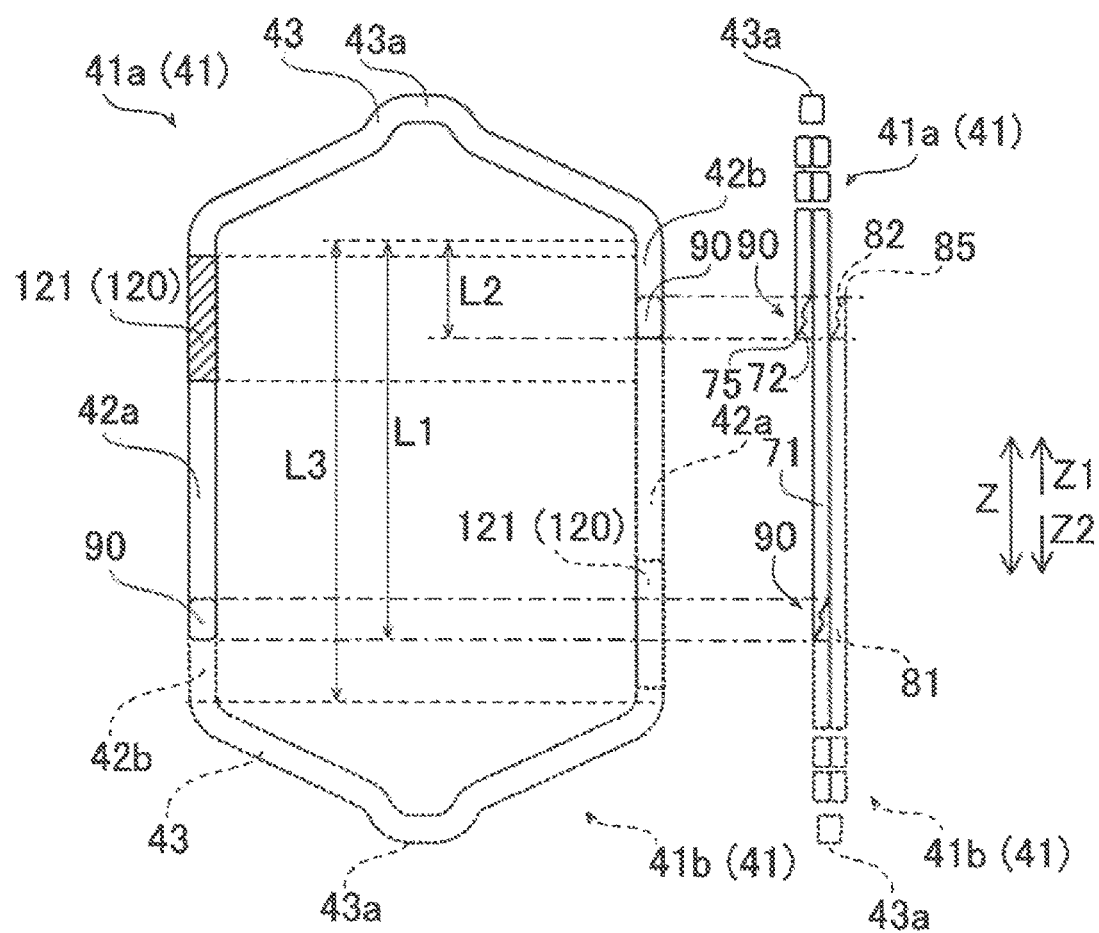
FIG. 9A is a front view and FIG. 9B is a side view.

As shown in FIG. 9, a segment conductor 40 includes leg parts 42a and 42b which are disposed in slots 12; and a coil end part 43. The leg parts 42a and 42b indicate portions disposed in slots 12 from an axial location of an end surface 10a or 10b of the stator core 10, and the coil end part 43 indicates a portion that is formed so as to continue to the leg parts 42a and 42b and that is disposed more on the axial outer side than the end surface 10a or 10b of the stator core 10. In addition, the coil end part 43 has a bent shape that bends in the axial direction. In addition, the coil end part 43 has a crank portion 43a formed in crank shape that radially bends in a stepwise manner for an amount corresponding to the width of a single segment conductor 40 as viewed in the axial direction. That is, the radial width of the crank portion 43a is double the width of a single segment conductor 40.

<Structure of the General Conductors>

As shown in FIG. 9, a general conductor 41 includes a pair of leg parts 42a and 42b disposed in different slots 12; and a coil end part 43 that connects the pair of leg parts 42a and 42b. By this, the general conductor 41 has a substantially U-shape or a substantially J-shape as viewed from the radial inner side. The leg parts 42a and 42b are formed linearly in the axial direction. Note that leg parts 42a and 42b of the power conductors 50 and leg parts 42a and 42b of the neutral point conductors 60 are configured in the same manner as the leg parts 42a and 42b of the general conductors 41, and thus, description thereof is omitted.

Here, the coil pitch of the general conductors 41 is six. Namely, a pair of leg parts 42a and 42b are disposed at different circumferential locations corresponding to six slots 12. Namely, five slots are provided between a slot 12 in which a leg part 42a of a general conductor 41 is disposed and a slot 12 in which a leg part 42b is disposed.

In addition, the pair of leg parts 42a and 42b have different axial lengths. Specifically, an axial length L1 of the leg part 42a is larger than an axial length L2 of the leg part 42b. Note that the axial length L1 (L2) of the leg part 42a (42b) indicates a length from an end 75 (85) to an axial location corresponding to the end surface 10a (10b) in the axial direction of the stator core 10. In addition, the axial lengths L1 and L2 are smaller than an axial length L3 of the stator core 10. Note that the axial length L3 of the stator core 10 indicates an axial distance (space) between the end surfaces 10a and 10b. For example, the axial length L1 is larger than one-half of the axial length L3, and the axial length L2 is smaller than one-half of the axial length L3.

In addition, the plurality of general conductors 41 include one-side general conductors 41a that are disposed on one axial side (the arrow "Z1" direction side) of the stator core 10 and included in the first coil assembly 30a; and other-side general conductors 41b that are disposed on the other axial side (the arrow "Z2" direction side) of the stator core 10 and included in the second coil assembly 30b.

(Configuration of the Joint Portions)

Figure 10:
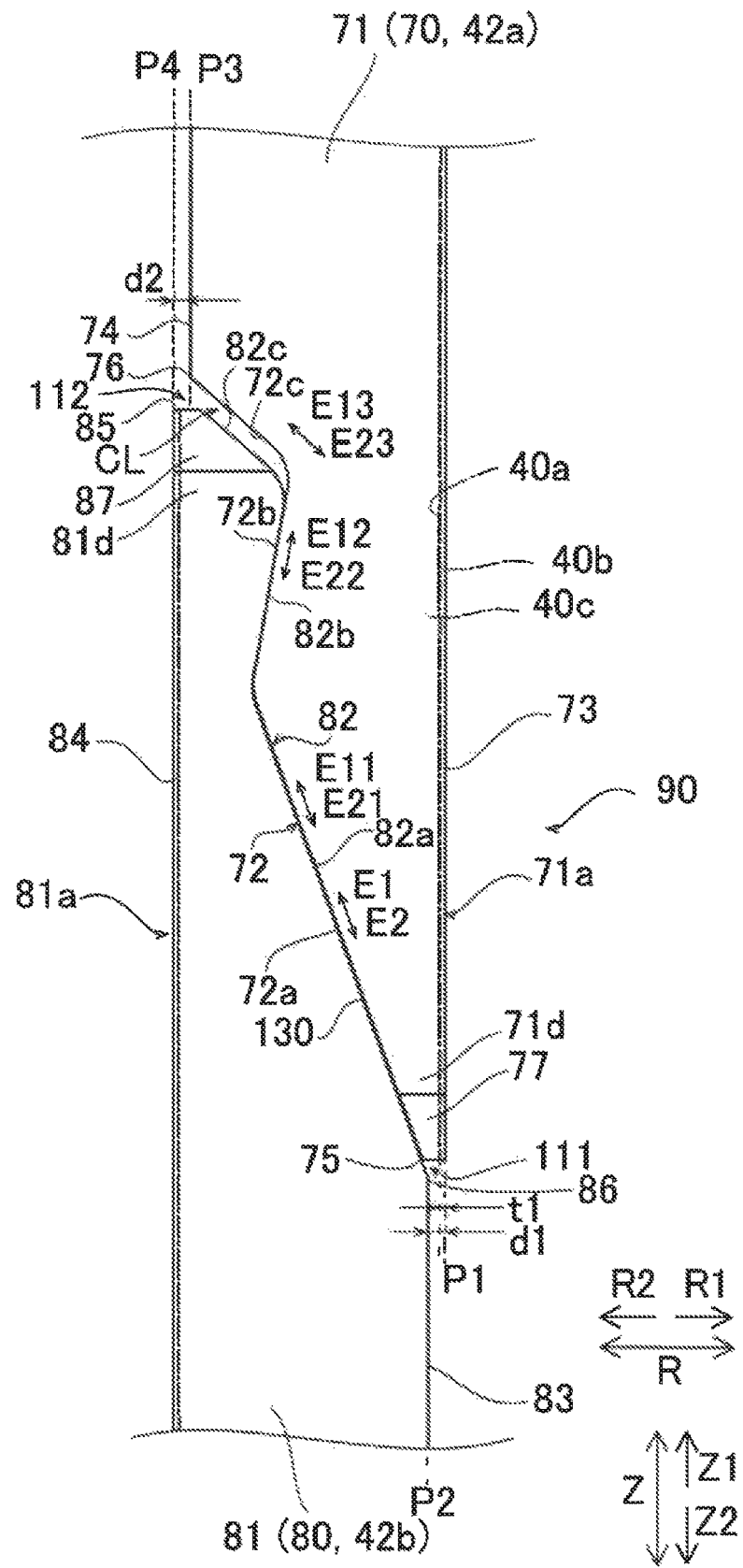
FIG. 10 is a diagram (1) of chamfered parts as viewed in a circumferential direction according to one embodiment.

As shown in FIG. 10, in a slot 12 of the stator core 10, a first leg part 71 which is a leg part 42a of a first segment conductor 70 which is one of a plurality of segment conductors 40 that is included in the first coil assembly 30a and a second leg part 81 which is a leg part 42b of a second segment conductor 80 which is a segment conductor 40 included in the second coil assembly 30b and axially facing the first segment conductor 70 are joined together at a joint portion 90.

Figure 13:
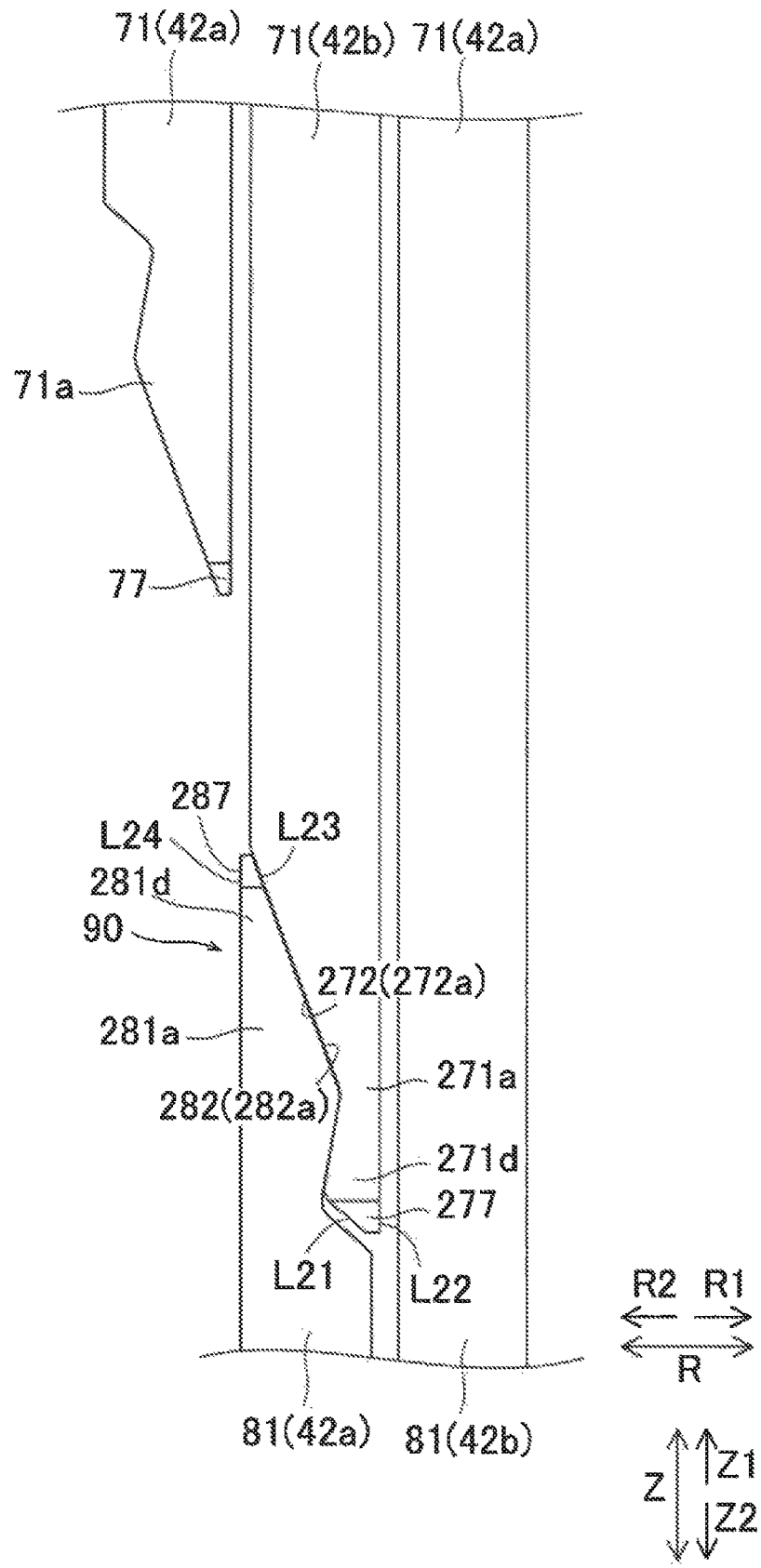
FIG. 13 is a diagram (2) of chamfered parts as viewed in the circumferential direction according to one embodiment.

Likewise, as shown in FIG. 13, in the slot 12 of the stator core 10, a first leg part 71 which is a leg part 42b of a first segment conductor 70 which is a segment conductor 40 included in the first coil assembly 30a and a second leg part 81 which is a leg part 42a of a second segment conductor 80 which is a segment conductor 40 included in the second coil assembly 30b are joined together at a joint portion 90.

Figure 11:
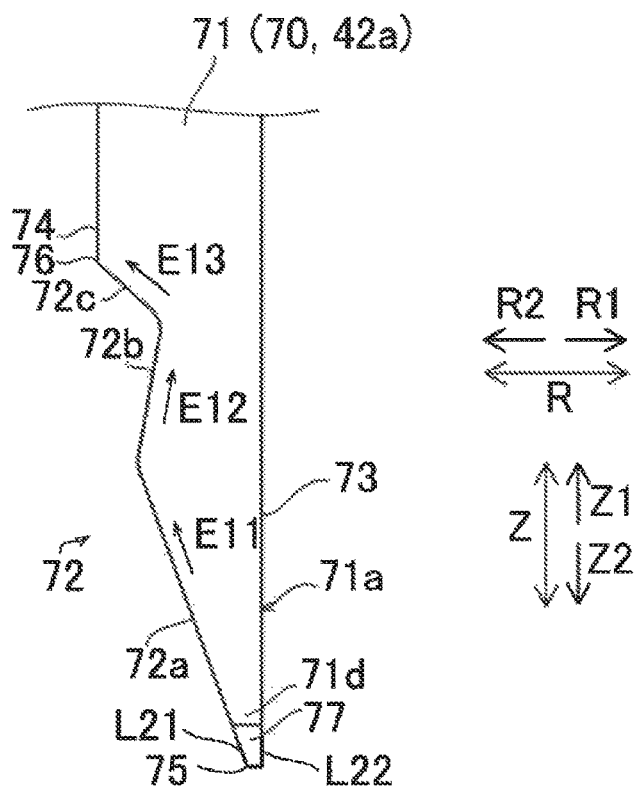
FIG. 11 is a diagram showing a configuration of a first facing surface of a first segment conductor according to one embodiment.

As shown in FIGS. 10 and 11, the first leg part 71 includes a first facing surface 72 facing the radial outer side (an arrow "R2" direction side) and facing the second leg part 81. In addition, the first leg part 71 includes a first one end surface 74 provided on one radial side which is the same side as the first facing surface 72; and a first other end surface 73 provided on the other radial side.

Figure 12:
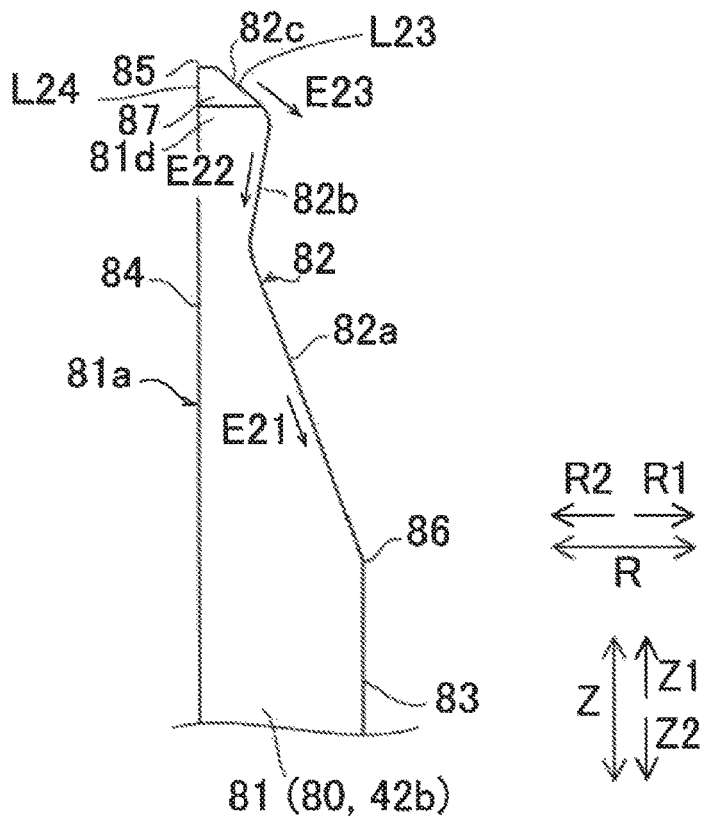
FIG. 12 is a diagram showing a configuration of a second facing surface of a second segment conductor according to one embodiment.

In addition, as shown in FIG. 12, the second leg part 81 includes a second facing surface 82 facing the radial inner side (an arrow "R1" direction side) and facing the first facing surface 72. In addition, the second leg part 81 includes a second one end surface 84 provided on one radial side which is an opposite side to a second joint surface 82a; and a second other end surface 83 provided on the other radial side. Note that the first facing surface 72 and the second facing surface 82 are an example of "facing surfaces" in the claims.

The first other end surface 73 of the first segment conductor 70 is disposed so as to be offset (to protrude) more radially (R1-direction side) than the second other end surface 83 of the second segment conductor 80. In addition, the second one end surface 84 of the second segment conductor 80 is disposed so as to be offset (to protrude) more radially (R2-direction side) than the first one end surface 74 of the first segment conductor 70.

Here, the joint portion 90 is a portion of the coil part 30 shown in FIG. 10, and is a portion including the first facing surface 72 and the second facing surface 82 and including a portion from an end 75 of the first leg part 71 to a boundary point 76 between the first facing surface 72 and the first one end surface 74 and a portion from an end 85 of the second leg part 81 to a boundary point 86 between the second facing surface 82 and the second other end surface 83.

An other step part 111 is formed at a portion between the end 75 of the first leg part 71 and the boundary point 86 of the second leg part 81, which is a boundary portion between the first other end surface 73 and the second other end surface 83. In addition, a one step part 112 is formed at a portion between the boundary point 76 of the first leg part 71 and the end 85 of the second leg part 81, which is a boundary portion between the first one end surface 74 and the second one end surface 84. Specifically, at the other step part 111, a step is formed so as to be recessed toward the inner sides of the segment conductors 40 in a direction from the first other end surface 73 to the second other end surface 83. In addition, at the one step part 112, a step is formed so as to be recessed toward the inner sides of the segment conductors 40 in a direction from the second one end surface 84 to the first one end surface 74.

In addition, a first displacement width d1 which is a displacement width between a radial location P1 of the first other end surface 73 and a radial location P2 of the second other end surface 83 is, for example, greater than the thickness t1 of the insulating film 40a of the segment conductor 40.

Figure 14:
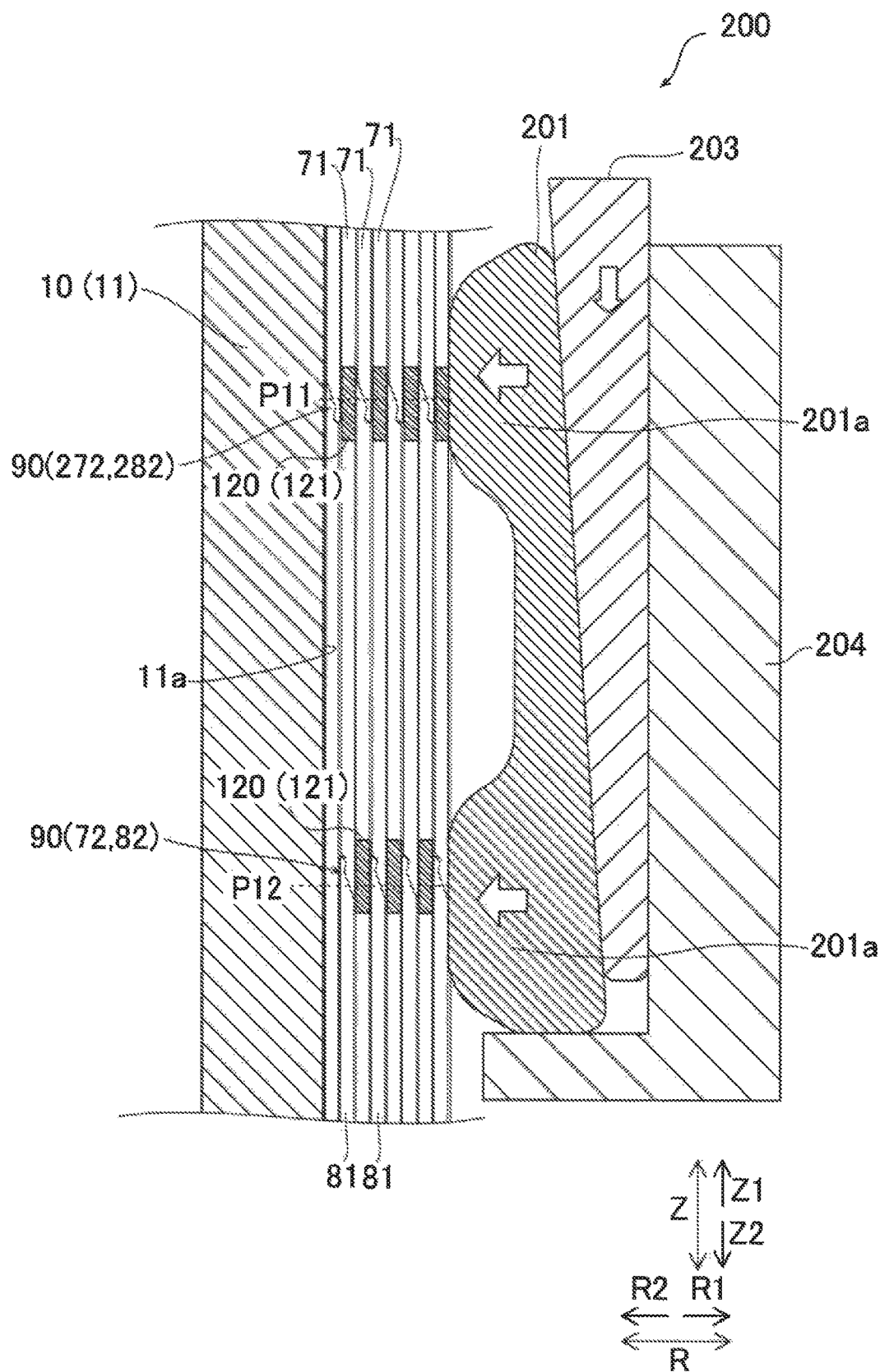
FIG. 14 is a diagram (side view) showing a manufacturing device according to one embodiment.

As shown in FIG. 14, a plurality of (e.g., eight) first leg parts 71 and a plurality of (e.g., eight) second leg parts 81 are disposed in a slot 12 so as to be radially adjacent to each other. Namely, the plurality of first leg parts 71 are parallelly and radially arranged and the plurality of second leg parts 81 are parallelly and radially arranged.

In the slot 12, one of first facing surfaces 72 of the plurality of first leg parts 71 is disposed at a different axial location than another first facing surface 272 radially adjacent thereto which will be described later. In addition, in the slot 12, one of second facing surfaces 82 of the plurality of second leg parts 81 is disposed at a different axial location than another second facing surface 282 radially adjacent thereto which will be described later. Namely, an axial location P11 of a joint portion 90 including a first facing surface 272 and a second facing surface 282 is a different location than an axial location P12 of a joint portion 90 including another first facing surface 72 and another second facing surface 82 which are radially adjacent to the first facing surface 272 and the second facing surface 282. Note that the first facing surface 272 and the second facing surface 282 are an example of "facing surfaces" in the claims.

In other words, in the axial locations P11 and P12, the first leg parts 71 and the second leg parts 81 are staggered in the radial direction.

<Configurations of the First Facing Surface and the Second Facing Surface>

As shown in FIG. 11, the first facing surface 72 of the first leg part 71 includes a first joint surface 72a which is inclined in an arrow "E11" direction; a first reverse inclined surface 72b which is inclined in an arrow "E12" direction; and a first separated and facing surface 72c which is inclined in an arrow "E13" direction. In addition, as shown in FIG. 12, the second facing surface 82 of the second leg part 81 includes a second joint surface 82a which is inclined in an arrow "E21" direction; a second reverse inclined surface 82b which is inclined in an arrow "E22" direction; and a second separated and facing surface 82c which is inclined in an arrow "E23" direction. A specific description will be made below.

As shown in FIG. 10, the first facing surface 72 of the first leg part 71 and the second facing surface 82 of the second leg part 81 are formed so as to be inclined with respect to the axial direction. Specifically, the first facing surface 72 is constructed as an end surface that is inclined with respect to the axial direction in an arrow "E1" direction from the end 75 of the first leg part 71. In addition, the first facing surface 72 is not provided with an insulating film 40a. The second facing surface 82 is constructed as an end surface that is inclined in an arrow "E2" direction from the end 85 of the second leg part 81. In addition, the second facing surface 82 is not provided with an insulating film 40a. Note that the arrow "E1" direction indicates a direction going from the end 75 toward the boundary point 76 between the first facing surface 72 and the first one end surface 74. Note also that the arrow "E2" direction indicates a direction going from the end 85 toward the boundary point 86 between the second facing surface 82 and the second other end surface 83.

The first facing surface 72 and the second facing surface 82 each are formed such that its radial cross-section has an S-shape. The first facing surface 72 having an S-shape (uneven shape) and the second facing surface 82 having an S-shape (uneven shape) are disposed in a slot 12, with the first facing surface 72 and the second facing surface 82 being radially engaged with each other.

In addition, a part of the first facing surface 72 and a part of the second facing surface 82 are joined together with a joint material 130. Specifically, the first facing surface 72 includes the first joint surface 72a which is joined to the second facing surface 82; and the first reverse inclined surface 72b which is formed continuously with the first joint surface 72a and which is inclined in an opposite direction (the arrow "E12" direction) to a direction in which the first joint surface 72a is inclined (the arrow "E11" direction) with respect to the axial direction (an axis parallel to the central axis line C1). In addition, the first joint surface 72a and the first reverse inclined surface 72b each are formed as a substantially flat surface, and the first joint surface 72a and the first reverse inclined surface 72b form a bent shape. In addition, the second facing surface 82 includes the second joint surface 82a which is joined to the first joint surface 72a; and the second reverse inclined surface 82b which is formed continuously with the second joint surface 82a and which is inclined in an opposite direction (the arrow "E22" direction) to a direction in which the second joint surface 82a is inclined (the arrow "E21" direction) with respect to the axial direction.

The joint material 130 is disposed between the first joint surface 72a and the second joint surface 82a, by which the first joint surface 72a and the second joint surface 82a are joined together and electrically connected to each other. Specifically, the joint material 130 includes a conductive material such as silver or copper. Preferably, the joint material 130 is a paste-like joint material (silver nanopaste) in which a solvent contains, as conductive particles, metal particles obtained by grinding silver into fine particles of a nanometer level. In addition, the joint material 130 contains a component (resin component) that is volatilized when heated, and has a function of allowing the first joint surface 72a and the second joint surface 82a to come close to each other by a reduction in the volume of the joint material 130 by heating the component that is volatilized.

As shown in FIG. 10, the first facing surface 72 includes the first separated and facing surface 72c which is formed continuously on an opposite side to the first joint surface 72a side of the first reverse inclined surface 72b and which is disposed so as to be separated from the second facing surface 82. In addition, the second facing surface 82 includes the second separated and facing surface 82c which is formed continuously on an opposite side to the second joint surface 82a side of the second reverse inclined surface 82b and which is disposed so as to be separated from the first facing surface 72.

Specifically, the first separated and facing surface 72c is inclined in the arrow "E13" direction which is an axially (an axis parallel to the central axis line C1) opposite direction to the first reverse inclined surface 72b. In addition, the second separated and facing surface 82c is inclined in the arrow "E23" direction which is an axially opposite direction (the axis parallel to the central axis line C1) to the second reverse inclined surface 82b. The second separated and facing surface 82c is disposed so as to face the first separated and facing surface 72c, and clearance CL is made between the first separated and facing surface 72c and the second separated and facing surface 82c.

In addition, the end 75 of the first leg part 71 and the end 85 of the second leg part 81 are formed on flat planes orthogonal to each other in the axial direction.

Note that although FIG. 10 shows that the end side of the first leg part 71 has a shape in which the end is thinner than the end side (end-thickening shape) of the second leg part 81, one side (the leg part 42a having the axial length L1) of the first leg part 71 has an end-thinning shape shown in FIG. 10, and the other side (the leg part 42b having the axial length L2) of the first leg part 71 has an end-thickening shape shown in FIG. 13. Likewise, the leg part 42a of the second leg part 81 (see FIG. 13) has an end-thinning shape, and the leg part 42b of the second leg part 81 (see FIG. 10) has an end-thickening shape. That is, the first segment conductor 70 and the second segment conductor 80 have substantially the same shape.

As shown in FIG. 13, in a portion where the leg part 42b of the first segment conductor 70 and the leg part 42a of the second segment conductor 80 are joined together, a first joint surface 272a included in a first facing surface 272 of the first segment conductor 70 and a second joint surface 282a included in a second facing surface 282 of the second segment conductor 80 are joined together.

Figure 15:
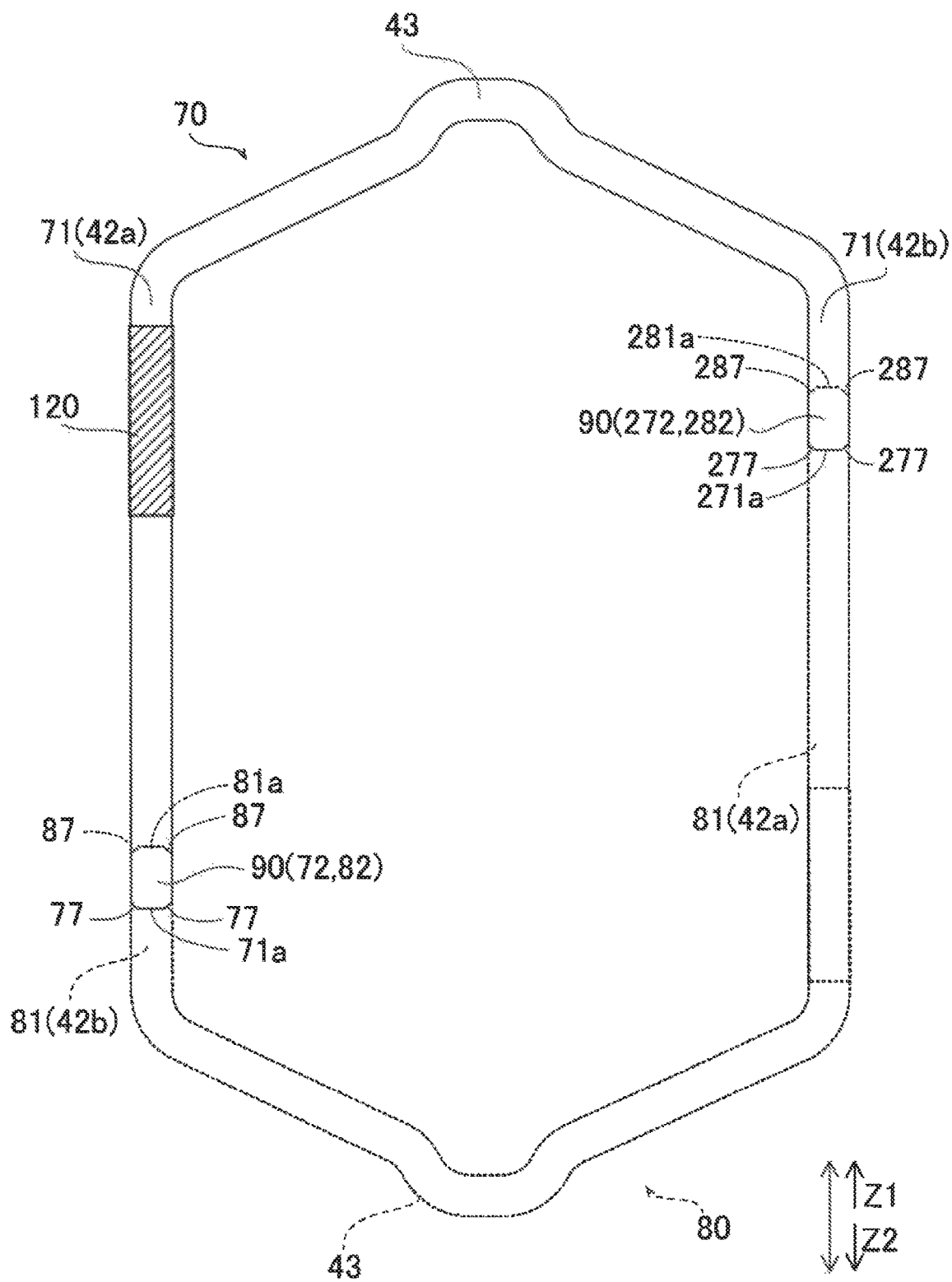
FIG. 15 is a diagram (2) showing a configuration of general conductors according to one embodiment.

Here, in the present embodiment, as shown in FIG. 15, a first facing surface 72 of a first segment conductor 70 and a second facing surface 82 of a second segment conductor 80 which are provided at an end part 71a of the first segment conductor 70 and an end part 81a of the second segment conductor 80 are disposed so as to overlap each other as viewed in the radial direction. Specifically, substantially the entire first facing surface 72 and substantially the entire second facing surface 82 overlap each other as viewed in the radial direction. In other words, the first facing surface 72 of the first segment conductor 70 and the second facing surface 82 of the second segment conductor 80 are disposed so as to radially face each other. The end part 71a of the first segment conductor 70 (leg part 42a) is provided with chamfered parts 77 at edge parts 71d on both circumferential sides thereof (as viewed in the radial direction). Likewise, the end part 81a of the second segment conductor 80 (leg part 42b) is provided with chamfered parts 87 at edge parts 81d on both circumferential sides thereof. Likewise, an end part 271a of the first segment conductor 70 (leg part 42b) is provided with chamfered parts 277 at edge parts 271d on both circumferential sides thereof. In addition, an end part 281a of the second segment conductor 80 (leg part 42a) is provided with chamfered parts 287 at edge parts 281d on both circumferential sides thereof.

(Configuration of the Chamfered Parts)

A specific configuration of the chamfered parts 77, the chamfered parts 277, the chamfered parts 87, and the chamfered parts 287 will be described below. Note that the chamfered parts 77, the chamfered parts 277, the chamfered parts 87, and the chamfered parts 287 have the same configuration and thus the chamfered parts 77 will be mainly described.

Figure 16:
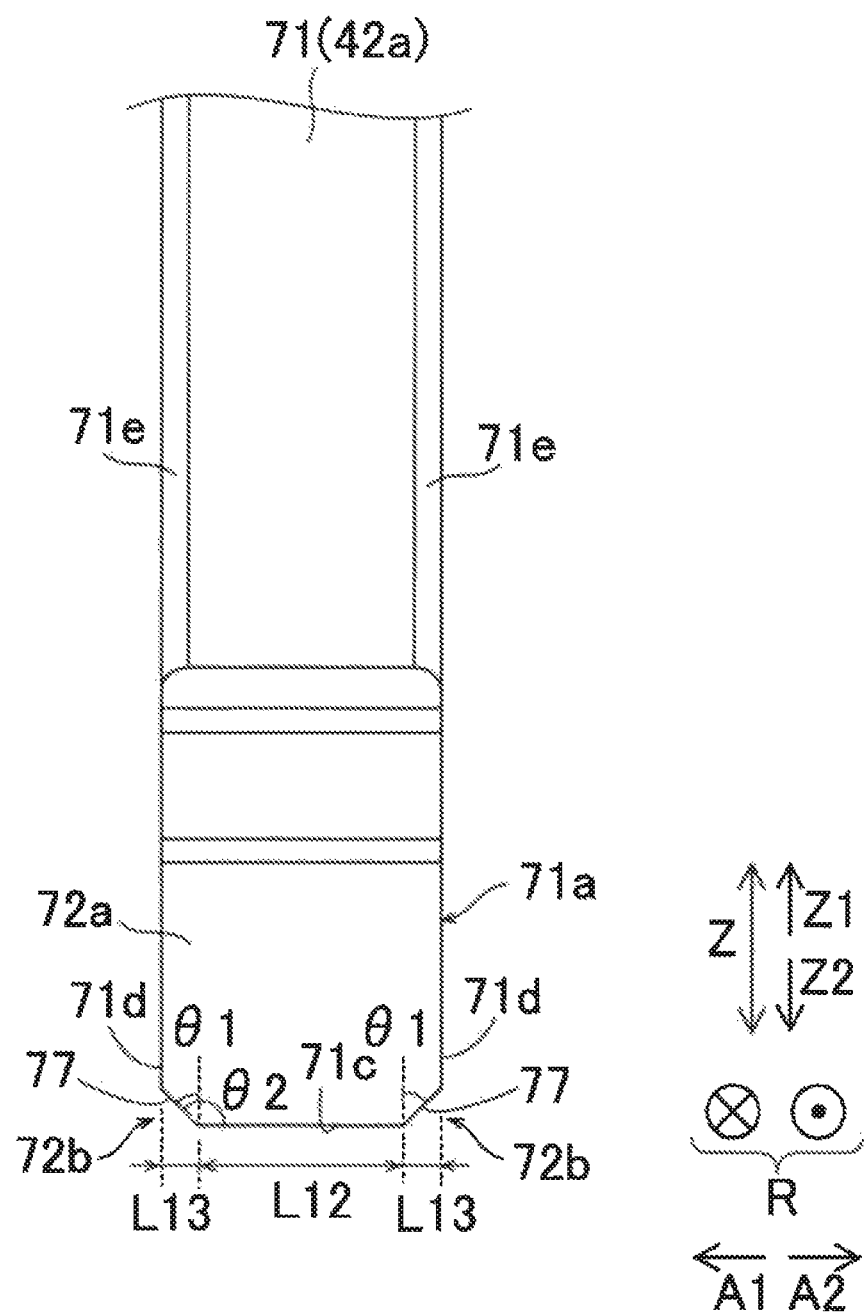
FIG. 16 is a diagram of chamfered parts as viewed in a radial direction according to one embodiment.

In the present embodiment, as shown in FIG. 16, chamfered parts 77 are provided on both circumferential sides of an end part 71*a* of a first segment conductor 70 as viewed in the radial direction. Specifically, by chamfering two corner parts 71*b* of the end part 71*a*, chamfered parts 77 are formed. A total circumferential length L11 of the chamfered parts 77 provided on both circumferential sides of the end part 71*a* (double a circumferential length L13 of a single chamfered part 77) is smaller than a circumferential length L12 of a portion 71*c* of the end part 71*a* other than the chamfered parts 77. For example, the total length L11 is less than one-half of the length L12.

The chamfered parts 77 are provided so as to intersect the central axis line direction at an angle θ1 of 45degrees or more as viewed in the radial direction. In other words, the chamfered parts 77 are provided so as to intersect the circumferential direction at an angle of less than 45 degrees as viewed in the radial direction. Note that in the present embodiment the chamfered parts 77 intersect the central axis line direction at an angle θ1 of substantially 45 degrees. In addition, an angle θ2 formed by each chamfered part 77 and the portion 71*c* of the end part 71*a* other than the chamfered parts 77 is an obtuse angle.

In addition, the chamfered parts 77 are provided at a first joint surface 72*a*. That is, by chamfering parts (corner parts) of the first joint surface 72*a*, chamfered parts 77 are formed. Note that chamfered parts 287 (see FIG. 13) are provided at a second joint surface 282*a*. In addition, chamfered parts 277 are provided at portions of a first leg part 71 more on the end side than a first joint surface 272*a*. In addition, the chamfered parts 287 are provided at portions of a second leg part 81 more on the end side than the second joint surface 282*a*.

In addition, as shown in FIG. 10, the first joint surface 72*a* and the second joint surface 82*a* both are provided so as to intersect the central axis line direction as viewed in the circumferential direction. The chamfered parts 77 are provided at the first joint surface 72*a* which is provided so as to intersect the central axis line direction. That is, the chamfered parts 77 are provided at the end part 71*a* of the first segment conductor 70 having an end-thinning shape. Likewise, as shown in FIG. 13, the chamfered parts 287 are provided at the second joint surface 282*a* which is provided so as to intersect the central axis line direction. That is, the chamfered parts 287 are provided at the end part 281*a* of the second segment conductor 80 having an end-thinning shape.

In addition, as described above, as shown in FIG. 5, an insulating member 20 is disposed so as to cover inner surfaces on the circumferential side of a slot 12 (circumferential side surfaces 13*a* of teeth 13) and an inner surface on the radial side of the slot 12 (a wall part 11*a* of the back yoke 11). As shown in FIG. 16, the chamfered parts 77 are provided at edge parts 71*d* on the circumferential side of the first facing surface 72 (side surfaces on the circumferential side of the end part 71*a*) that face the insulating member 20. In addition, the edge parts 71*d* on the circumferential side of the end part 71*a* are disposed so as to be in contact with the insulating member 20 or to be slightly spaced apart from the insulating member 20.

As shown in FIG. 16, the chamfered parts 77 have a linear shape that linearly intersects a plane perpendicular to the central axis line direction. That is, the chamfered parts 77 have a flat plane shape.

Note that corner parts 71*e* (four corner parts 71*e*) of the leg part 42*a* are chamfered, and the chamfered parts 77 are provided separately from this chamfering.

Likewise, as shown in FIG. 15, chamfered parts 87 are provided at edge parts 81*d* on both circumferential sides of an end part 81*a* of a second segment conductor 80 as viewed in the radial direction (see FIG. 12). In addition, the total circumferential length of the chamfered parts 87, the angle of inclination of the chamfered parts 87 with respect to the central axis line direction, and the shape (linear shape) of the chamfered parts 87 are the same as those of the above-described chamfered parts 77.

In addition, chamfered parts 277 are provided at edge parts 271*d* on both circumferential sides of an end part 271*a* (see FIG. 13) of the first segment conductor 70 as viewed in the radial direction. In addition, the total circumferential length of the chamfered parts 277, the angle of inclination of the chamfered parts 277 with respect to the central axis line direction, and the shape (linear shape) of the chamfered parts 277 are the same as those of the above-described chamfered parts 77.

In addition, chamfered parts 287 are provided at edge parts 281*d* on both circumferential sides of an end part 281*a* (see FIG. 13) of the second segment conductor 80 as viewed in the radial direction. In addition, the total circumferential length of the chamfered parts 287, the angle of inclination of the chamfered parts 287 with respect to the central axis line direction, and the shape (linear shape) of the chamfered parts 287 are the same as those of the above-described chamfered parts 77.

In addition, in the present embodiment, as shown in FIGS. 11 to 13, the first facing surface 72 (272) of the first segment conductor 70 and the second facing surface 82 (282) of the second segment conductor 80 are provided so as to radially face each other and extend in the central axis line direction. The chamfered parts 77 (277, 87, 287) are provided at an end and edge parts on both circumferential sides of at least one (both in the present embodiment) of the first facing surface 72 (272) of the first segment conductor 70 and the second facing surface 82 (282) of the second segment conductor 80.

In addition, in the present embodiment, the first segment conductor 70 includes the first other end surface 73 provided on a radially opposite side to the first facing surface 72 (272) and provided so as to extend in the central axis line direction. In addition, the second segment conductor 80 includes the second one end surface 84 provided on a radially opposite side to the second facing surface 82 (282) and provided so as to extend in the central axis line direction. The chamfered parts 77 (277, 87, 287) are provided at an end and edge parts on both circumferential sides of at least one (both in the present embodiment) of the first other end surface 73 of the first segment conductor 70 and the second one end surface 84 of the second segment conductor 80. Note that the first other end surface 73 and the second one end surface 84 are an example of "back surfaces" in the claims.

In addition, in the present embodiment, as shown in FIGS. 11 and 13, a line segment L21 that forms an outer edge of the chamfered part 77 (277) provided at the first facing surface 72 (272) and a line segment L22 that forms an outer edge of the chamfered part 77 (277) provided at the first other end surface 73 are provided on the same plane. Likewise, as shown in FIGS. 12 and 13, a line segment L23 that forms an outer edge of the chamfered part 87 (287) provided at the second facing surface 82 (282) and a line segment L24 that forms an outer edge of the chamfered part 87 (287) provided at the second one end surface 84 are provided on the same plane.

<Configuration of Insulating Parts>

Figure 8B:
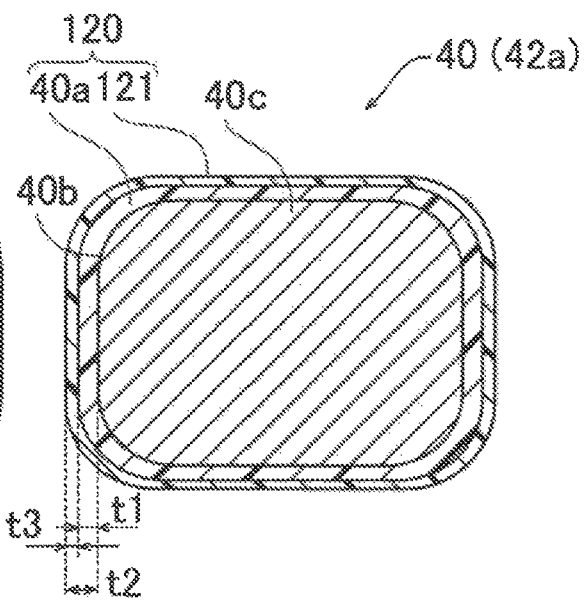

In addition, as shown in FIG. 8, the coil part 30 is provided with insulating parts 120. One of a plurality of parallelly arranged segment conductors 40 has an insulating part 120 provided at a portion of a conductor surface 40b thereof (see FIG. 8(b)) at an axial location corresponding to a joint portion 90 of other segment conductors 40 disposed so as to be radially adjacent to the one segment conductor 40 (hereinafter, this joint portion 90 is referred to as "adjacent joint portion 90"), the insulating part 120 having a thickness t2 larger than a thickness t1 of an insulating film 40a of the adjacent joint portion 90.

(Manufacturing Device for the Stator)

Figure 17:
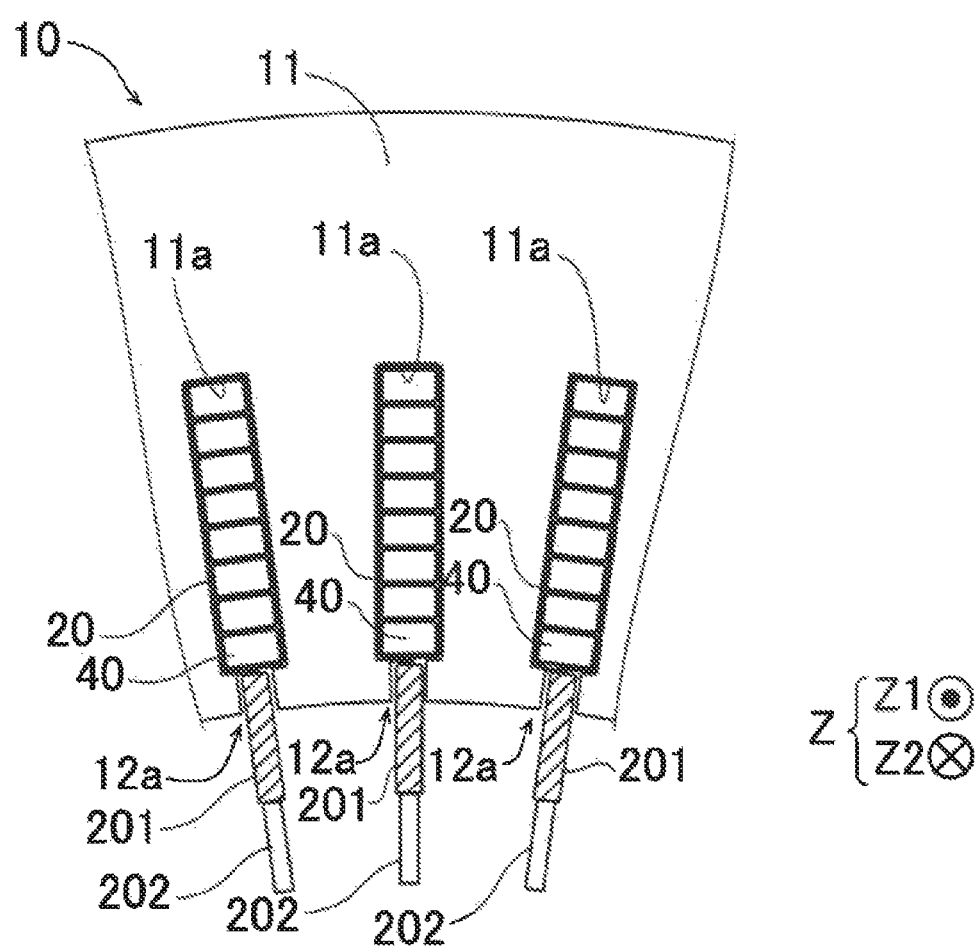
FIG. 17 is a diagram (top view) showing the manufacturing device according to one embodiment.

Next, a manufacturing device 200 for the stator 100 will be described. In the present embodiment, as shown in FIG. 14, the manufacturing device 200 for the stator 100 includes pressing jigs 201. The pressing jigs 201 independently and radially press the first leg parts 71 of the first segment conductors 70 and the second leg parts 81 of the second segment conductors 80 which are disposed in the plurality of slots 12, on a per slot 12 basis. Specifically, as shown in FIG. 17, the pressing jigs 201 are disposed for the respective plurality of slots 12 and configured to be radially movable. In addition, a plurality of (the same number as the number of the slots 12) pressing jigs 201 are provided for the respective plurality of slots 12 and configured to be independently and radially movable on a per pressing jig 201 basis.

In addition, the manufacturing device 200 for the stator 100 includes movement mechanism parts 202 that allow the pressing jigs 201 to independently move on a per slot 12 basis. The movement mechanism parts 202 are provided for the respective plurality of pressing jigs 201 and configured to be able to adjust the amount of radial movement on a per pressing jig 201 basis. The movement mechanism parts 202 are composed of, for example, actuators.

In addition, as shown in FIG. 14, each pressing jig 201 includes contact portions 201a that come into contact with a first segment conductor 70 and a second segment conductor 80. Each contact portion 201a has a shape whose corner parts are chamfered as viewed in the circumferential direction.

In addition, two contact portions 201a are provided so as to protrude toward the radial outer side. The two contact portions 201a are provided so as to be axially separated from each other. In addition, the two contact portions 201a are configured to press locations corresponding to joint portions 90 of leg parts 42a and 42b (see FIG. 14). By the pressing jig 201 pressing the leg parts 42a and 42b, the joint portions 90 provided on a Z1-direction side and the joint portions 90 provided on a Z2-direction side are simultaneously pressed by the two contact portions 201a, respectively.

In addition, as shown in FIG. 14, the manufacturing device 200 for the stator 100 is provided with a push-out member 203 and a holding member 204. The holding member 204 is configured to hold the pressing jig 201 and the push-out member 203. In addition, the push-out member 203 is formed, for example, in wedge shape (tapered shape) that becomes gradually thinner toward one axial side, and is configured such that axial movement of the push-out member 203 presses (pushes out) the pressing jig 201 toward the radial outer side, and a pressing force is transmitted to segment conductors 40 while allowing the pressing jig 201 to move toward the radial outer side.

(Method for Manufacturing the Stator)

Figure 18:
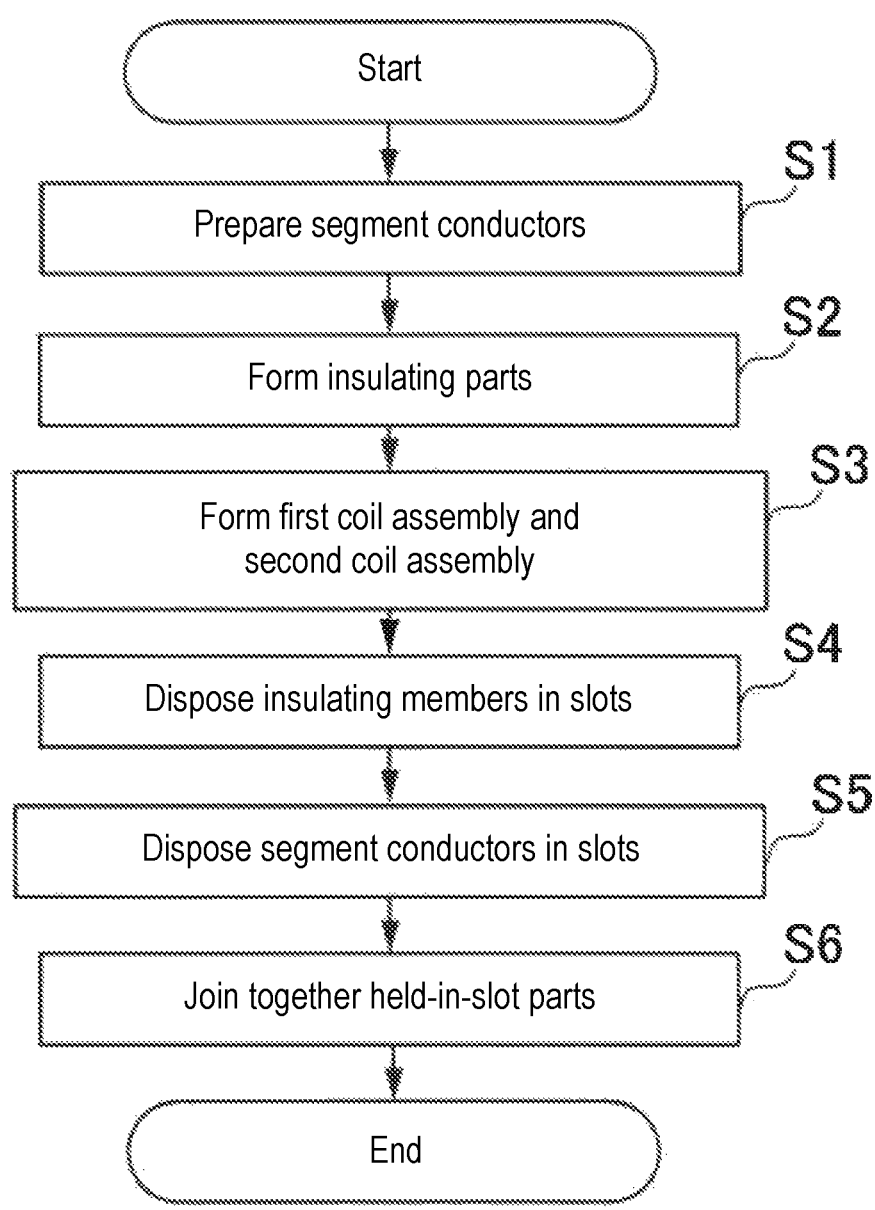
FIG. 18 is a flowchart showing steps of manufacturing the stator according to one embodiment.

Next, a method for manufacturing the stator 100 according to the present embodiment will be described. FIG. 18 shows a flowchart for describing the method for manufacturing the stator 100.

(Step of Preparing Segment Conductors)

First, at step S1, a plurality of segment conductors 40 are prepared. Specifically, there are prepared power conductors 50 that form power-line connection end parts Pt for the respective phases of a Y-connected coil part 30; neutral point conductors 60 that form neutral point connection end parts Nt for the respective phases of the coil part 30; and general conductors 41 that form other portions of the coil part 30.

For example, as shown in FIG. 8(a), an insulating film 40a made of an insulating material such as polyimide is formed (coated) on a rectangular conductor surface 40b made of a conductive material such as copper. Thereafter, conductors (rectangular conducting wires) having the insulating films 40a formed thereon are shaped by a forming jig (not shown), by which general conductors 41 (see FIG. 9), outside diameter side power conductors 52 and inside diameter side power conductors 53 for forming power conductors 50, outside diameter side neutral point conductors 61, and inside diameter side neutral point conductors 62 are formed.

<Formation of General Conductors>

Specifically, as shown in FIG. 9, a pair of leg parts 42a and 42b having different axial lengths and disposed in different slots 12 (e.g., the slot pitch is six) and a coil end part 43 that connects the pair of leg parts 42a and 42b are formed, by which a general conductor 41 is formed. Note that the formation of power conductors 50 and neutral point conductors 60 is omitted.

In addition, as shown in FIG. 15, chamfered parts 77 and chamfered parts 277 are formed in advance at first leg parts 71 (a leg part 42a and a leg part 42b) of a first segment conductor 70. In addition, chamfered parts 87 and chamfered parts 287 are formed in advance at second leg parts 81 (a leg part 42a and a leg part 42b) of a second segment conductor 80.

<Formation of Insulating Parts>

Then, at step S2 (see FIG. 18), an insulating part 120 having a thickness t2 larger than a thickness t1 of the insulating film 40a formed at a joint portion 90 is provided on the conductor surface 40b of each segment conductor 40.

As shown in FIG. 9, by mounting an insulating member 121 on a leg part 42a having a longer axial length out of a pair of leg parts 42a and 42b, an insulating part 120 is formed. Specifically, an insulating member 121 is mounted on each of the leg parts 42a of the general conductors 41, the leg parts 42a of the outside diameter side power conductors 52, and the leg parts 42a of the outside diameter side neutral point conductors 61.

Specifically, as shown in FIG. 8(b), a sheet-like insulating member 121 having a thickness t3 smaller than the thickness t1 is wound around a leg part 42a once or more and fixed. By this, when the number of windings is one, an insulating part 120 having a thickness t2 (=t1+t3) larger than the thickness t1 is formed on the leg part 42a.

(Formation of a First Coil Assembly and a Second Coil Assembly)

At step S3 (see FIG. 18), as shown in FIG. 3, a first coil assembly 30a and a second coil assembly 30b each having an annular shape and including a plurality of segment conductors 40 are formed.

As shown in FIG. 3, a first coil assembly 30a and a second coil assembly 30b each having an annular shape and including a plurality of segment conductors 40 are formed such that the insulating part 120 of one segment conductor 40 is located in a position radially adjacent to a joint portion 90 of other segment conductors 40 disposed so as to be radially adjacent to the one segment conductor 40. Note that although FIG. 3 only shows some (two) of the plurality of insulating parts 120 by hatching for the sake of description, in the present embodiment, all leg parts 42a are provided with the insulating parts 120.

Specifically, as shown in FIG. 14, in the first coil assembly 30a and the second coil assembly 30b, the segment conductors 40 are formed such that a plurality of (e.g., eight) segment conductors 40 are parallelly and radially arranged, and such a number of segment conductors 40 that is equal to the number of the slots 12 are parallelly and circumferentially arranged. At this time, the first coil assembly 30a and the second coil assembly 30b are formed such that the insulating part 120 of one of the plurality of parallelly arranged segment conductors 40 is located in an axial position corresponding to a joint portion 90 of other segment conductors 40 disposed so as to be radially adjacent to the one segment conductor 40.

(Step of Disposing Insulating Members in the Slots)

Figure 19:
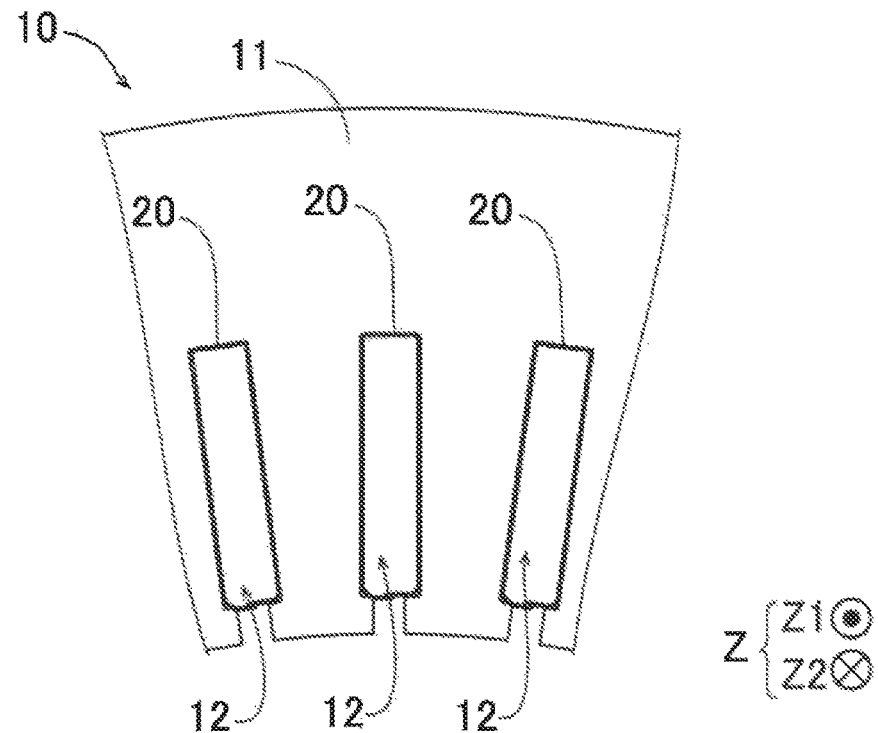
FIG. 19 is a cross-sectional view for describing a step of disposing insulating members in slots according to one embodiment.

At step S4 (see FIG. 18), as shown in FIG. 19, an insulating member 20 is disposed in each of the plurality of slots 12. The insulating member 20 is disposed so as to be exposed or open on both axial sides and closed on the radial inner side. In addition, as shown in FIG. 3, the disposed insulating member 20 is held in the slot 12 by collar parts 22 on both axial sides.

(Step of Disposing the Segment Conductors in the Slots)

At step S5 (see FIG. 18), as shown in FIG. 3, the plurality of segment conductors 40 are disposed in the plurality of slots 12. Specifically, the first coil assembly 30a and the second coil assembly 30b are allowed to axially move relative to each other toward the plurality of slots 12, by which each of the leg parts 42a and 42b of the first coil assembly 30a and the second coil assembly 30b is disposed in one of the plurality of slots 12. For example, the first coil assembly 30a is allowed to move in parallel (linearly move) to the stator core 10 in the arrow "Z2" direction and the second coil assembly 30b is allowed to move in parallel (linearly move) to the stator core 10 in the arrow "Z1" direction, by which each of the leg parts 42a and 42b is disposed in one of the plurality of slots 12 (the slots 12 having the insulating members 20 disposed therein).

Figure 20:
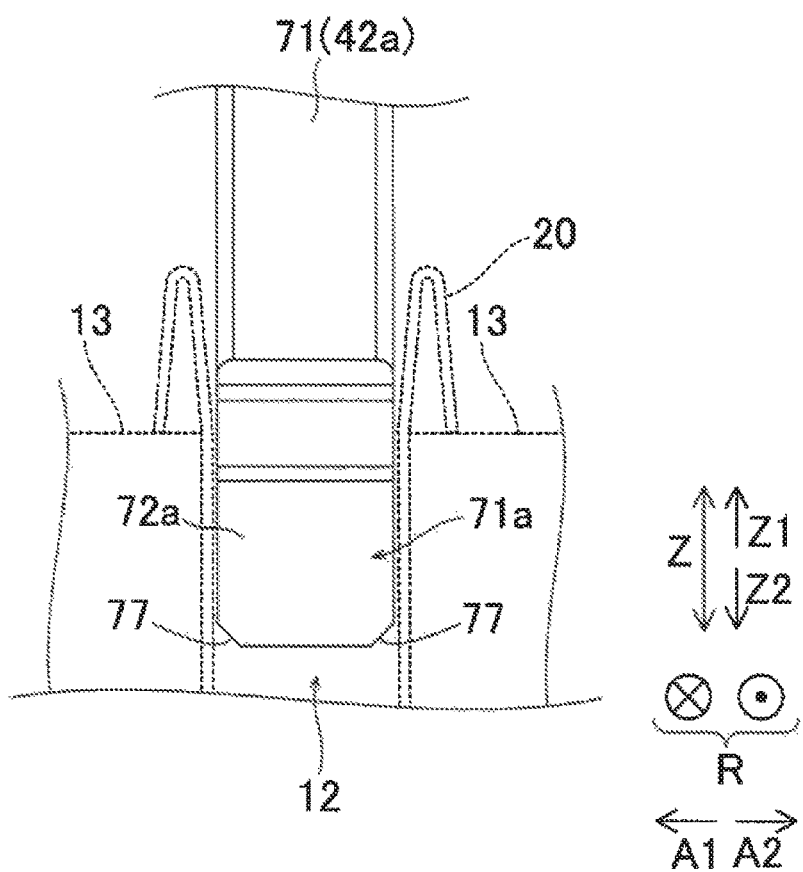
FIG. 20 is a diagram showing a state in which a segment conductor is inserted into a slot having an insulating member disposed therein, according to one embodiment.

Here, as shown in FIG. 20, since a leg part 42a of a first segment conductor 70 is provided with chamfered parts 77, when the leg part 42a is inserted into a slot 12 (in space enclosed by an insulating member 20), an end part (an end part 71a) of the leg part 42a can be prevented from getting stuck in corner parts of the slot 12 (corner parts of teeth 13). Likewise, since a leg part 42b of the first segment conductor 70 is provided with chamfered parts 277, when the leg part 42b is inserted into a slot 12, an end part 71a of the leg part 42b can be prevented from getting stuck in corner parts of the slot 12. Likewise, since leg parts 42a and 42b of a second segment conductor 80 are provided with chamfered parts 87 and 287, respectively, end parts 81a and 281a can be prevented from getting stuck in corner parts of slots 12. In addition, the insulating members 20 can be prevented from getting damaged by the corner parts of the leg parts 42a and the leg parts 42b inserted in the slots 12 (in pieces of space enclosed by the insulating members 20).

In addition, as shown in FIG. 14, by disposing the first coil assembly 30a and the second coil assembly 30b in the slots 12, the plurality of segment conductors 40 are disposed in the slots 12 such that the insulating part 120 of one of a plurality of parallelly and radially arranged segment conductors 40 is located in an axial position corresponding to a joint portion 90 disposed so as to be radially adjacent to the insulating part 120.

(Step of Joining Together the Leg Parts)

At step S6 (see FIG. 18), as shown in FIG. 14, the first leg parts 71 of the first segment conductors 70 and the second leg parts 81 of the second segment conductors 80 that axially face the first segment conductors 70 are radially pressed (pressurized) on a per slot 12 basis, by which the first leg parts 71 and the second leg parts 81 are joined together in the slot 12.

Note that by heating at least a joint material 130 by a heating device (not shown) while leg parts 42a and 42b are pressed by a pressing jig 201, at least a part of a first facing surface 72 and at least a part of a second facing surface 82 are joined together, forming a joint portion 90. Specifically, a first joint surface 72a (see FIG. 10) and a second joint surface 82a are joined together. In addition, a first joint surface 272a (see FIG. 13) and a second joint surface 282a are joined together.

Then, in one slot 12, first leg parts 71 of a power conductor 50 and a neutral point conductor 60 and second leg parts 81 which are either one of leg parts 42a and 42b of general conductors 41 are joined together, and in another slot 12, second leg parts 81 which are the other one of the leg parts 42a and 42b of the general conductors 41 and first leg parts 71 of general conductors 41 are joined together. As a result, a wave-shaped coil part 30 is formed.

As shown in FIG. 14, a portion where a first leg part 71 and a second leg part 81 are joined together serves as an electrically joined joint portion 90. By this, an insulating part 120 is disposed at a location (axial location) radially adjacent to the joint portion 90. In addition, an axial location P11 of a joint portion 90 is a different location than an axial location P12 of a joint portion 90 of segment conductors 40 radially adjacent thereto.

In addition, the first leg parts 71 and the second leg parts 81 together with the insulating members 20 whose radial inner sides are closed are pressed by the pressing jigs 201 from the radial inner side. Thereafter, as shown in FIG. 2, a stator 100 is completed. Note that as shown in FIG. 1, by combining the stator 100 with a rotor 101, a rotating electrical machine 102 is manufactured.

[Advantageous Effects of the Present Embodiment]

In the above-described present embodiment, the following advantageous effects can be obtained.

In the present embodiment, as described above, facing surfaces (72, 82, 272, 282) which are portions where a first segment conductor (70) and a second segment conductor (80) are joined together and which are provided at an end part (71a, 271a) of the first segment conductor (70) and an end part (81a, 281a) of the second segment conductor (80) are disposed so as to overlap each other as viewed in the radial direction, and the end part (71a, 271a) of the first segment conductor (70) and the end part (81a, 281a) of the second segment conductor (80) each are provided with chamfered parts (77, 87, 277, 287) at edge parts on both circumferential sides thereof (71d, 81d, 271d, 281d). By this, since the facing surface (72, 272) of the first segment conductor (70) and the facing surface (82, 282) of the second segment conductor (80) are provided so as to overlap each other as viewed in the radial direction, even when chamfered parts (77, 87, 277, 287) are provided at the end part of at least one of the first segment conductor (70) and the second segment conductor (80), the amount of reduction in the area of the facing surface (72, 82, 272, 282) can be reduced. As a result, a shortage of a joint area can be prevented.

In addition, since the facing surfaces (72, 82, 272, 282) provided at the end part (71a, 271a) of the first segment conductor (70) and the end part (81a, 281a) of the second segment conductor (80) are disposed so as to overlap each other as viewed in the radial direction, a joint material (130) disposed on the facing surfaces (72, 82, 272, 282) can be prevented from flowing in the radial direction. As a result, leg parts (42a, 42b) can be appropriately bonded together. In addition, since the end part (71a, 271a) of the first segment conductor (70) and the end part (81a, 281a) of the second segment conductor (80) each are provided with the chamfered parts (77, 87, 277, 287) at edge parts on both circumferential sides thereof (71d, 81d, 271d, 281d), when the first segment conductor (70) and the second segment conductor (80) are inserted into a slot (12), at least one of the first segment conductor (70) and the second segment conductor (80) can be smoothly inserted into the slot (12). By these configurations, the leg parts (42a, 42b) can be appropriately bonded together while the insertion properties of the leg parts (42a, 42b) into the slot (12) improve. In addition, since the end part (71a, 271a) of the first segment conductor (70) and the end part (81a, 281a) of the second segment conductor (80) are provided with the chamfered parts (77, 87, 277, 287), an insulating member (20) disposed in the slot (12) can be prevented from getting damaged by the first segment conductor (70) and the second segment conductor (80).

In addition, in the present embodiment, as described above, a total circumferential length (L11) of the chamfered parts (77, 87, 277, 287) provided on both circumferential sides of the end part (71a, 81a, 271a, 281a) is smaller than a circumferential length (L12) of a portion (71C) of the end part (71a, 81a, 271a, 281a) other than the chamfered parts (77, 87, 277, 287). By such a configuration, unlike a case in which the total circumferential length (L11) of the chamfered parts (77, 87, 277, 287) is greater than or equal to the circumferential length (L12) of the portion (71C) of the end part (71a, 81a, 271a, 281a) other than the chamfered parts (77, 87, 277, 287), the size of the chamfered parts (77, 87, 277, 287) is relatively small, and thus, a reduction in the size of the end part (71a, 81a, 271a, 281a) where the facing surface (72, 82, 272, 282) is provided can be prevented. By this, joint strength between the leg parts (42a, 42b) can be ensured.

In addition, in the present embodiment, as described above, the chamfered parts (77, 87, 277, 287) are provided so as to intersect the central axis line direction at an angle of 45 degrees or more as viewed in the radial direction. By such a configuration, since the size of portions of the end part (71a, 81a, 271a, 281a) that are cut away as a result of the formation of the chamfered parts (77, 87, 277, 287) can be made relatively small, a reduction in the size of the end part (71a, 81a, 271a, 281a) where the facing surface (72, 82, 272, 282) is provided can be effectively prevented.

In addition, in the present embodiment, as described above, the chamfered parts (77, 287) are provided at a first joint surface (72a) and a second joint surface (282a). By such a configuration, since the chamfered parts (77, 287) are provided at the first joint surface (72a) (the second joint surface (282a)) that comes into contact with corners of a slot (12) (corners of teeth (13)) at a relatively early stage upon inserting the first segment conductor (70) (the second segment conductor (80)) into the slot (12), the first segment conductor (70) (the second segment conductor (80)) can be more smoothly inserted into the slot (12).

In addition, in the present embodiment, as described above, the chamfered parts (77, 287) are provided at the first joint surface (72a) and the second joint surface (282a) which are provided so as to intersect the central axis line direction. By such a configuration, compared to a case in which the first joint surface (72a) and the second joint surface (282a) are provided along the central axis line direction, the areas of the first joint surface (72a) and the second joint surface (282a) can be increased. Therefore, by providing the chamfered parts (77, 287) at the first joint surface (72a) and the second joint surface (282a) which are provided so as to intersect the central axis line direction, the influence of a reduction in joint area caused by the formation of the chamfered parts (77, 287) can be reduced.

In addition, in the present embodiment, as described above, the chamfered parts (77, 87, 277, 287) are provided at both of the end parts (71a, 271a) of the first segment conductor (70) and the end parts (81a, 281a) of the second segment conductor (80). By such a configuration, both the first segment conductor (70) and the second segment conductor (80) can be smoothly inserted into slots (12), and damage to insulating members (20) by both the first segment conductor (70) and the second segment conductor (80) can be prevented.

In addition, in the present embodiment, as described above, the chamfered parts (77, 87, 277, 287) are provided at the edge parts (71d, 81d, 271d, 281d) on the circumferential side of the facing surface (72, 82, 272, 282) that face an insulating member (20). By such a configuration, since the chamfered parts (77, 87, 277, 287) are provided at the edge parts (71d, 81d, 271d, 281d) of the facing surface (72, 82, 272, 282) that face the insulating member (20), damage to the insulating member (20) can be effectively prevented.

In addition, in the present embodiment, as described above, the chamfered parts (77, 87, 277, 287) have a linear shape that linearly intersects the circumferential direction as viewed in the radial direction. By such a configuration, since the chamfered parts (77, 87, 277, 287) have a relatively simple shape, the chamfered parts (77, 87, 277, 287) can be easily formed.

In addition, in the present embodiment, as described above, a first leg part (71) of the first segment conductor (70) and a second leg part (81) of the second segment conductor (80) are joined together in a slot (12). By such a configuration, since the end part (71a, 271a) of the first segment conductor (70) and the end part (81a, 281a) of the second segment conductor (80) each are provided with the chamfered parts (77, 87, 277, 287) at edge parts on both circumferential sides thereof (71d, 81d, 271d, 281d), the first leg part (71) and the second leg part (81) can be smoothly inserted into the slot (12) and joined together.

In addition, in the present embodiment, as described above, the facing surface (72, 272) of the first segment conductor (70) and the facing surface (82, 282) of the second segment conductor (80) are provided so as to radially face each other and extend in the central axis line direction. The chamfered parts (77, 87, 277, 287) are provided at an end and edge parts on both circumferential sides of at least one of the facing surface (72, 272) of the first segment conductor (70) and the facing surface (82, 282) of the second segment conductor (80). By such a configuration, even when the chamfered parts (77, 87, 277, 287) are provided at the end part of at least one of the first segment conductor (70) and the second segment conductor (80), the amount of reduction in the area of the facing surface (72, 82, 272, 282) can be effectively reduced.

In addition, in the present embodiment, as described above, the first segment conductor (70) and the second segment conductor (80) each include a back surface (73, 84) provided on a radially opposite side to the facing surface (72, 82, 272, 282) and provided so as to extend in the central axis line direction. The chamfered parts (77, 87, 277, 287) are provided at an end and edge parts on both circumferential sides of at least one of the back surface (73) of the first segment conductor (70) and the back surface (84) of the second segment conductor (80). By such a configuration, since the chamfered parts (77, 87, 277, 287) are provided so as to go across from the facing surface (72, 82, 272, 282) to the back surface (73, 84), the first segment conductor (70) and the second segment conductor (80) can be smoothly inserted into the slot (12).

In addition, in the present embodiment, as described above, a line segment (L21, L23) that forms an outer edge of the chamfered part (77, 87, 277, 287) provided at the facing surface (72, 82, 272, 282) and a line segment (L22, L24) that forms an outer edge of the chamfered part (77, 87, 277, 287) provided at the back surface (73, 84) are provided on the same plane. By such a configuration, since the chamfered parts (77, 87, 277, 287) have a planar shape, the chamfered parts (77, 87, 277, 287) can be easily formed.

[Variants]

Note that the presently disclosed embodiment is to be considered in all respects as illustrative and not restrictive. The scope of the preferred embodiment is indicated by the claims rather than the description of the above-described embodiment, and all changes (variants) which come within the meaning and range of equivalency of the claims are further embraced therein.

For example, although the above-described embodiment shows an example in which two leg parts (42a and 42b) of a segment conductor have different lengths, the preferred embodiment is not limited thereto. For example, the two leg parts of the segment conductor may have the same length.

In addition, although the above-described embodiment shows an example in which chamfered parts are provided so as to intersect the central axis line direction at an angle of substantially 45 degrees as viewed in the radial direction, the preferred embodiment is not limited thereto. For example, the chamfered parts may be provided so as to intersect the central axis line direction at an angle of greater than 45 degrees as viewed in the radial direction.

In addition, although the above-described embodiment shows an example in which the chamfered parts are provided at both of a pair of leg parts, the preferred embodiment is not limited thereto. For example, the chamfered parts may be provided at only one of the pair of leg parts.

In addition, although the above-described embodiment shows an example in which the chamfered parts are provided at both of first leg parts of a first segment conductor and second leg parts of a second segment conductor, the preferred embodiment is not limited thereto. For example, the chamfered parts may be provided at only the first leg parts of the first segment conductor without being provided at the second segment conductor, or may be provided at only the second leg parts of the second segment conductor without being provided at the first segment conductor.

Figure 21:
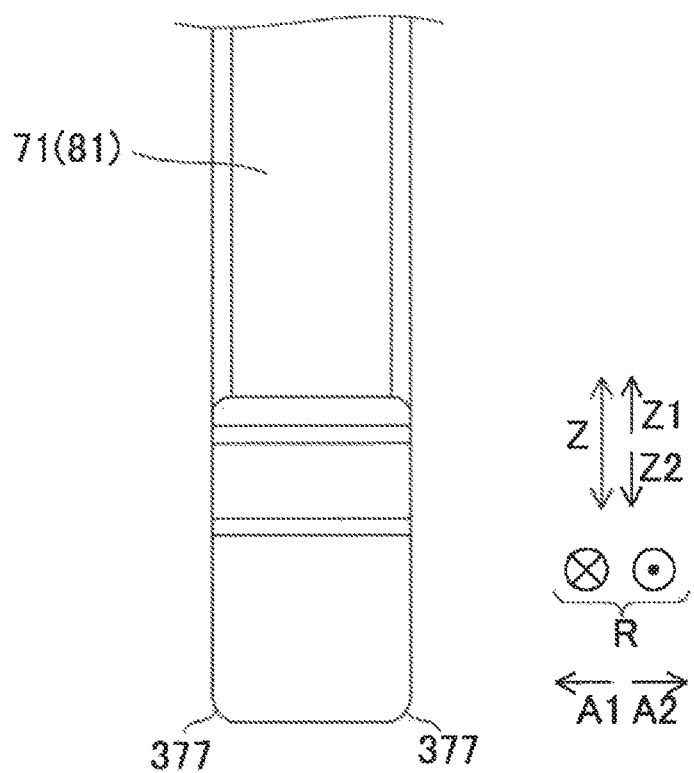
FIG. 21 is a diagram showing chamfered parts according to a first variant.

In addition, although the above-described embodiment shows an example in which the chamfered parts have a linear shape with respect to a plane perpendicular to the central axis line direction as viewed in the radial direction, the preferred embodiment is not limited thereto. For example, as shown in a first variant shown in FIG. 21, chamfered parts 377 may be configured to have a round shape (R-shape) as viewed in the radial direction. By such a configuration, since the chamfered parts 377 have a round shape, leg parts 42a and 42b can be further prevented from getting stuck in corner parts of a slot 12 (corner parts of teeth 13) and an insulating member 20 can be further prevented from getting damaged.

Figure 22:
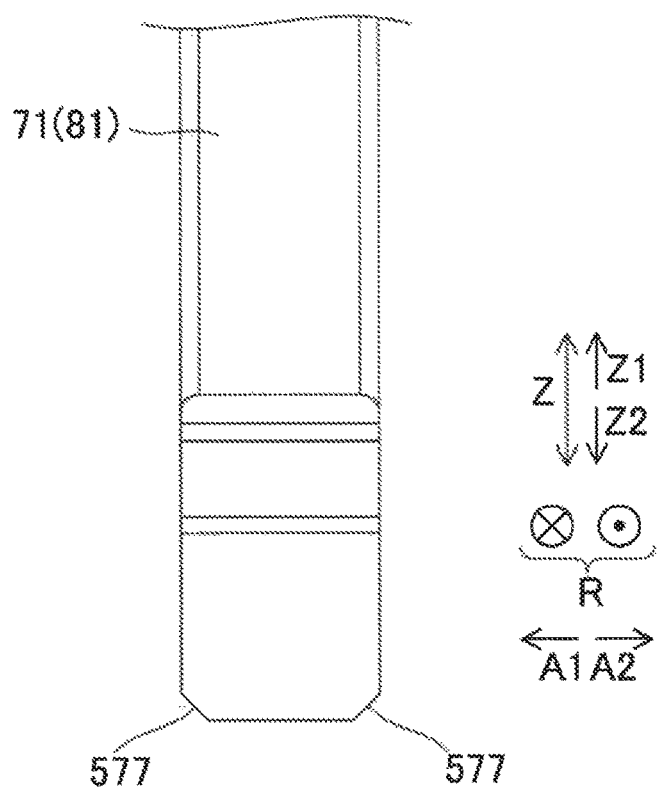
FIG. 22 is a diagram (diagram as viewed in the radial direction) showing chamfered parts according to a second variant.
Figure 23:
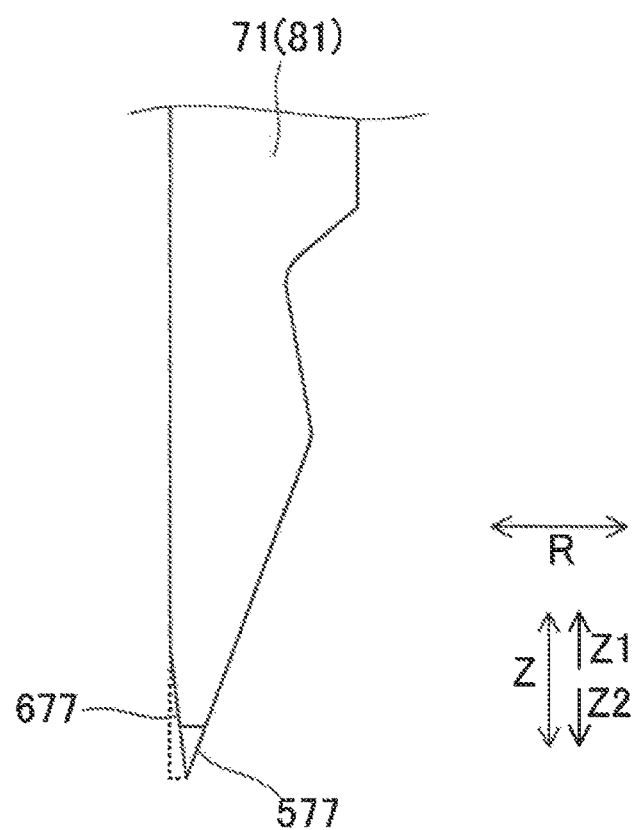
FIG. 23 is a diagram (diagram as viewed in the circumferential direction) showing the chamfered parts according to the second variant.

In addition, although the above-described embodiment shows an example in which the chamfered parts are provided at end parts of a first segment conductor (second segment conductor) as viewed in the radial direction, the preferred embodiment is not limited thereto. For example, as shown in a second variant shown in FIGS. 22 and 23, a chamfered part 677 may be provided at an end part of a first segment conductor 70 (second segment conductor 80) as viewed in the circumferential direction in addition to the radial direction. That is, the end part is provided with both of chamfered parts 577 that intersect the central axis line direction as viewed in the radial direction (see FIG. 22) and the chamfered part 677 that intersects the circumferential direction as viewed in the circumferential direction (see FIG. 23). By this, for example, when the first segment conductor 70 and the second segment conductor 80 are inserted into a slot 12, the segment conductor being inserted (the first segment conductor 70 or the second segment conductor 80) can be prevented from getting stuck in a segment conductor (a first segment conductor 70 or a second segment conductor 80) disposed so as to be radially adjacent thereto. As a result, the insertion properties of the first segment conductor 70 and the second segment conductor 80 into the slot 12 can be further improved.

In addition, although the above-described embodiment shows an example in which a first leg part of a first segment conductor and a second leg part of a second segment conductor are joined together in a slot, the preferred embodiment is not limited thereto. For example, a leg part of a first segment conductor and a leg part of a second segment conductor may be joined together on an axial outside of an end surface (10a or 10b) of the stator core. In this case, facing surfaces where the leg parts are joined together are disposed on the axial outside of the end surface (10a or 10b) of the stator core.

Figure 24:
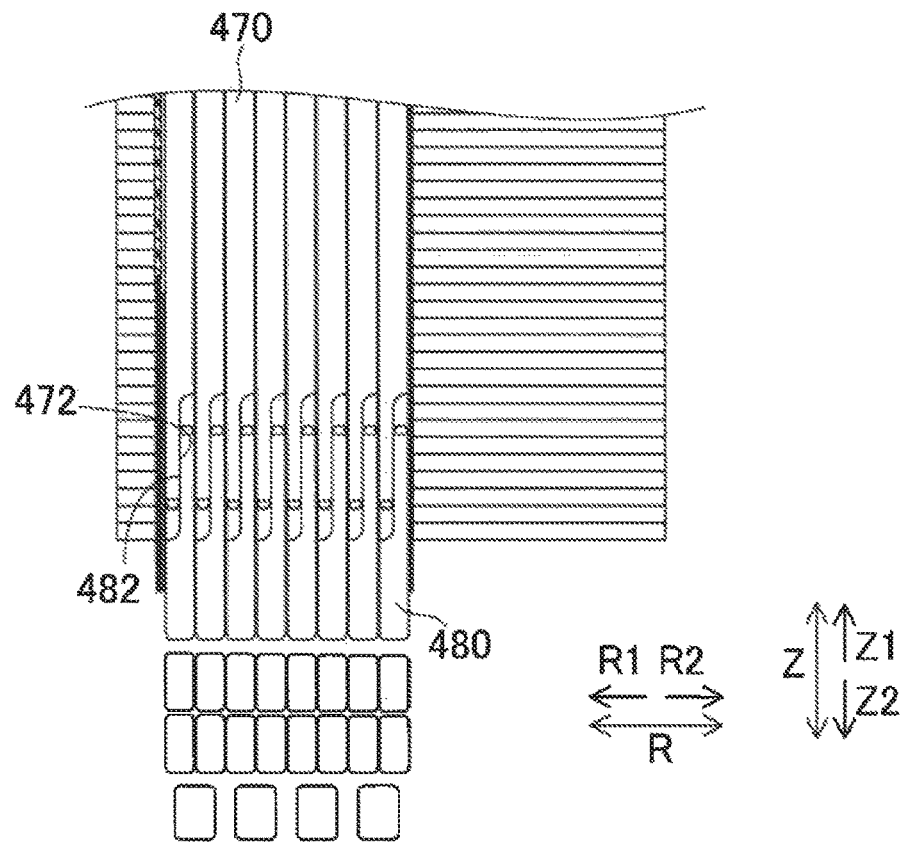
FIG. 24 is a diagram of first segment conductors and second segment conductors which are joined together as viewed in the circumferential direction, according to a third variant.
Figures 25, 26:
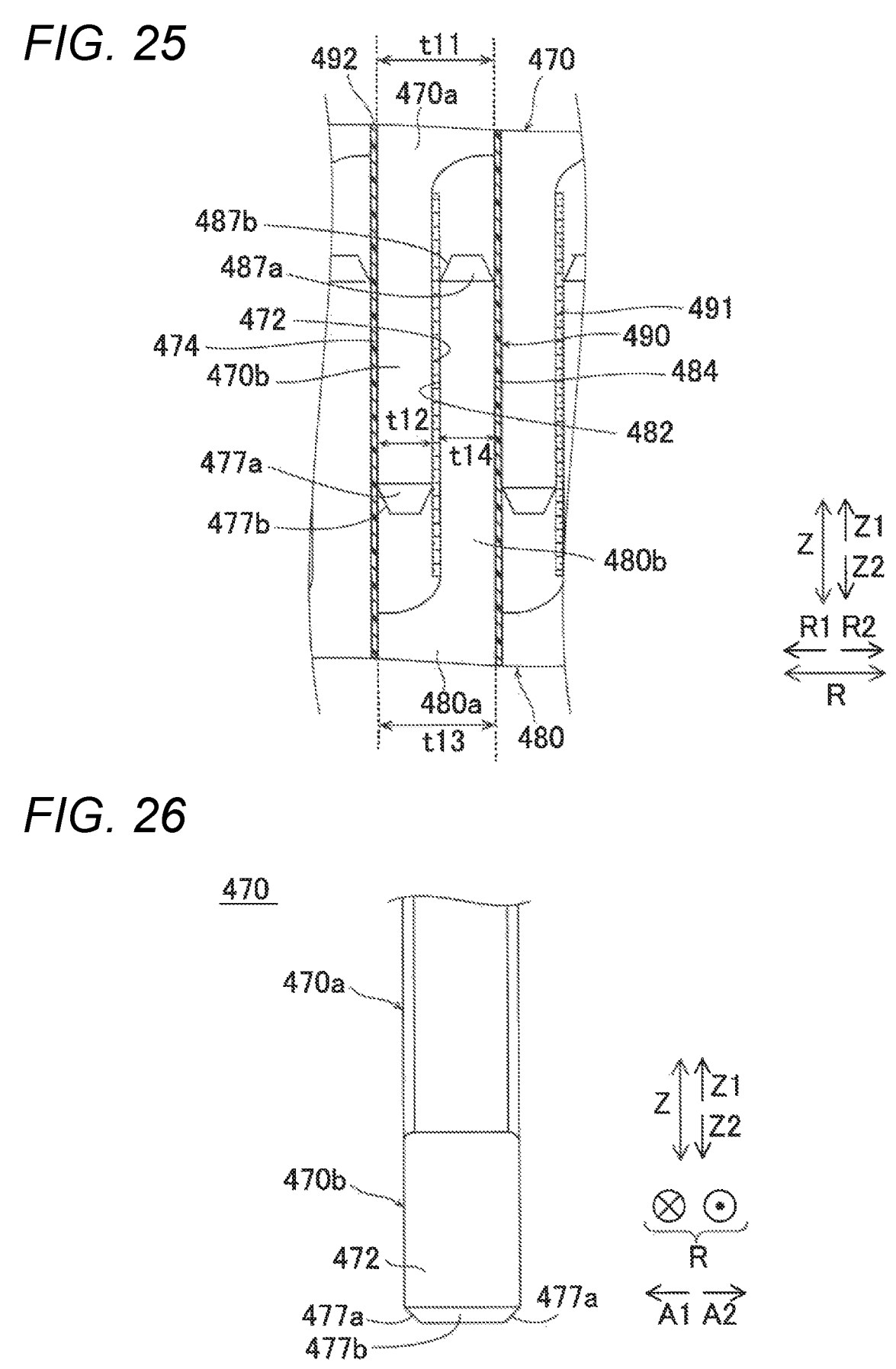
Figure 27:
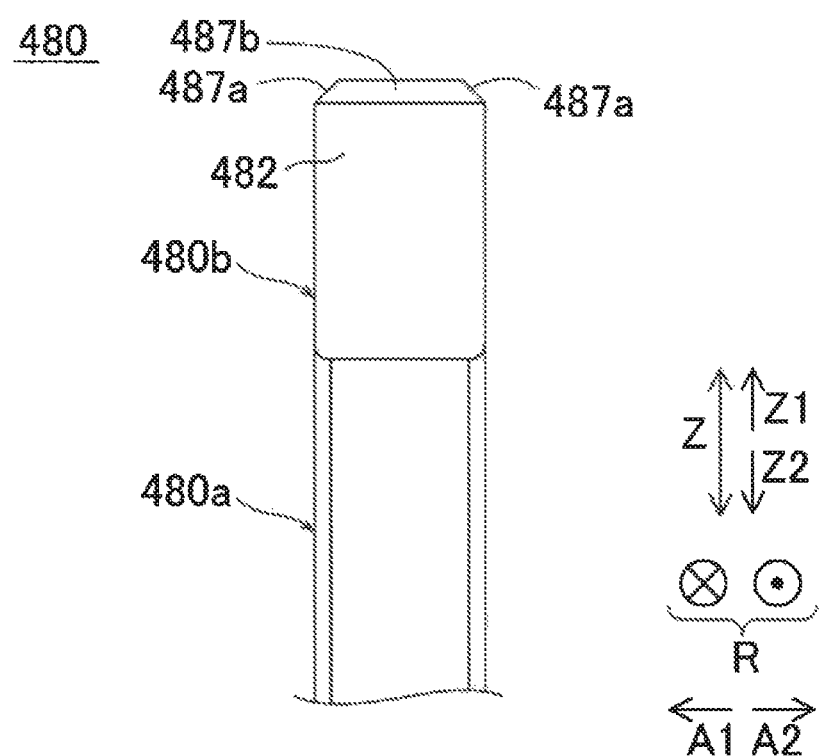
FIG. 27 is a diagram of a second segment conductor as viewed in the radial direction according to the third variant.

In addition, although the above-described embodiment shows an example in which, as shown in FIG. 10, the first joint surface 72a (first facing surface 72) and the second joint surface 82a (second facing surface 82) both are provided so as to intersect the central axis line direction as viewed in the circumferential direction, the preferred embodiment is not limited thereto. For example, like a first segment conductor 470 and a second segment conductor 480 according to a third variant shown in FIGS. 24 and 25, a first facing surface 472 and a second facing surface 482 may be flat surfaces lying in the central axis line direction. Note that, as shown in FIG. 26, chamfered parts 477a are formed at an end and on both circumferential sides of a first facing surface 472 (and a back surface 474). In addition, as shown in FIG. 27, chamfered parts 487a are formed at an end and on both circumferential sides of a second facing surface 482 (and a back surface 484). In addition, the end of the first segment conductor 470 has chamfered parts 477b formed also on both radial edges thereof In addition, the end of the second segment conductor 480 has chamfered parts 487b formed also on both radial edges thereof. Note that, in the third variant, the first facing surface 472 indicates a surface of a first segment conductor end part 470b of the first segment conductor 470 that faces in the radial direction, the first segment conductor end part 470b having a thickness t12 smaller than a first segment conductor main body part 470a having a thickness t11. Likewise, the second facing surface 482 indicates a surface of a second segment conductor end part 480b of the second segment conductor 480 that faces in the radial direction, the second segment conductor end part 480b having a thickness t14 smaller than a second segment conductor main body part 480a having a thickness t13.

In addition, as shown in FIG. 25, by joining together a part of a first facing surface 472 and a part of a second facing surface 482 with a conductive adhesive 491, a joint portion 490 is formed. In addition, a joint portion insulating member 492 for insulating the joint portion 490 is provided between a back surface 474 of a first segment conductor 470 and a back surface 484 of a second segment conductor 480.

REFERENCE SIGNS LIST

10: Stator core (armature core), 12: Slot, 20: Insulating member, 30: Coil part, 40: Segment conductor, 42a, 42b: Leg part, 70, 470: First segment conductor, 71a, 271a: End part, 71c: Portion (other than chamfered parts), 71d, 81d, 271d, 281d: Edge parts (on both circumferential sides), 72, 272: First facing surface (facing surface), 72a, 272a: First joint surface, 73: First other end surface (back surface), 77, 87, 277, 287, 377, 577: Chamfered part, 80, 480: Second segment conductor, 81a, 281a: End part, 82, 282: Second facing surface (facing surface), 82a, 282a: Second joint surface, 84: Second one end surface (back surface), 100: Stator (armature), 474: Back surface, and 484: Back surface

The invention claimed is:

1. An armature comprising:
an armature core provided with a plurality of slots extending in a central axis line direction; and
a coil part having a plurality of segment conductors whose facing surfaces are joined together, the plurality of segment conductors being disposed so as to face the central axis line direction,
wherein
the plurality of segment conductors include a first segment conductor disposed on one side in the central axis line direction of the armature core; and a second segment conductor disposed on an other side in the central axis line direction of the armature core,
the facing surfaces provided at an end part of the first segment conductor and an end part of the second segment conductor are disposed so as to overlap each other as viewed in a radial direction, the facing surfaces being portions where the first segment conductor and the second segment conductor are joined together,
the end part of at least one of the first segment conductor and the second segment conductor is provided with chamfered parts at edge parts on both circumferential sides of the end part,
the facing surface of the first segment conductor and the facing surface of the second segment conductor are provided so as to radially face each other and extend in the central axis line direction,
the chamfered parts are provided at an end and edge parts on both circumferential sides of at least one of the facing surface of the first segment conductor and the facing surface of the second segment conductor,
the first segment conductor and the second segment conductor each include a back surface provided on a radially opposite side to the facing surface and provided so as to extend in the central axis line direction,
the chamfered parts are provided at an end and edge parts on both circumferential sides of at least one of the back surface of the first segment conductor and the back surface of the second segment conductor, and
the chamfered parts continuously extend from the facing surface to the back surface.

2. The armature according to claim 1, wherein a total circumferential length of the chamfered parts provided on both circumferential sides of the end part is smaller than a circumferential length of a portion of the end part other than the chamfered parts.

3. The armature according to claim 1, wherein the chamfered parts are provided so as to intersect the central axis line direction at an angle of 45 degrees or more as viewed in a radial direction.

4. The armature according to claim 1, wherein
a facing surface of the first segment conductor includes a first joint surface radially facing the second segment conductor and joined to the second segment conductor,
a facing surface of the second segment conductor includes a second joint surface radially facing the first joint surface of the first segment conductor and joined to the first joint surface, and
the chamfered parts are provided with at least one of the first joint surface and the second joint surface.

5. The armature according to claim 4, wherein
the first joint surface and the second joint surface both are provided so as to intersect the central axis line direction as viewed in a circumferential direction, and
the chamfered parts are provided with at least one of the first joint surface and the second joint surface.

6. The armature according to claim 1, wherein the chamfered parts are provided at both of the end part of the first segment conductor and the end part of the second segment conductor.

7. The armature according to claim 1, further comprising an insulating member disposed so as to cover inner surfaces on a circumferential side and an inner surface on a radial side of each of the slots,
wherein
the chamfered parts are provided at edge parts on a circumferential side of the facing surface, the edge parts facing the insulating member.

8. The armature according to claim 1, wherein the chamfered parts have a linear shape that linearly intersects a plane perpendicular to the central axis line direction.

9. The armature according to claim 1, wherein the chamfered parts have a round shape as viewed in a radial direction.

10. The armature according to claim 1, wherein a first leg part of the first segment conductor and a second leg part of the second segment conductor are joined together in one of the slots.

11. The armature according to claim 1, wherein a line segment that forms an outer edge of the chamfered part provided at the facing surface and a line segment that forms an outer edge of the chamfered part provided at the back surface are provided on a same plane.

* * * * *